(12) United States Patent
Matsui

(10) Patent No.: US 7,880,963 B2
(45) Date of Patent: Feb. 1, 2011

(54) ZOOM MICROSCOPE

(75) Inventor: Kumiko Matsui, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/461,506

(22) Filed: Aug. 13, 2009

(65) Prior Publication Data
US 2010/0014154 A1 Jan. 21, 2010

Related U.S. Application Data

(62) Division of application No. 11/288,383, filed on Nov. 29, 2005, now Pat. No. 7,593,157.

(30) Foreign Application Priority Data

Nov. 29, 2004 (JP) ............................. 2004-344039
Nov. 29, 2004 (JP) ............................. 2004-344086
Jun. 30, 2005 (JP) ............................. 2005-193126

(51) Int. Cl.
G02B 21/00 (2006.01)
(52) U.S. Cl. ....................... 359/380; 359/676
(58) Field of Classification Search ........................ None
See application file for complete search history.

(56) References Cited

U.S. PATENT DOCUMENTS

| 4,200,354 | A | 4/1980 | Hoffman |
| 4,255,014 | A * | 3/1981 | Ellis ............ 359/371 |
| 5,959,772 | A | 9/1999 | Yonezawa |
| 6,292,306 | B1 * | 9/2001 | Betensky ............ 359/663 |
| 6,580,081 | B1 | 6/2003 | Thorwirth |
| 6,674,582 | B2 | 1/2004 | Kawasaki |
| 7,362,511 | B2 | 4/2008 | Suzuki |
| 2001/0003490 | A1 * | 6/2001 | Kawasaki et al. ........ 359/385 |
| 2003/0048530 | A1 | 3/2003 | Sander |
| 2003/0165021 | A1 | 9/2003 | Kawasaki |
| 2003/0185550 | A1 | 10/2003 | Shirota et al. |
| 2004/0017609 | A1 | 1/2004 | Danz et al. |
| 2004/0112535 | A1 * | 6/2004 | Fujimoto et al. ....... 156/345.24 |
| 2004/0156118 | A1 | 8/2004 | Kawasaki |
| 2005/0174654 | A1 | 8/2005 | Kawasaki |
| 2006/0092504 | A1 | 5/2006 | Hayashi |

FOREIGN PATENT DOCUMENTS

| JP | A 51-29149 | 3/1976 |
| JP | A 06-018784 | 1/1994 |
| JP | A 07-281099 | 10/1995 |
| JP | A 11-095174 | 4/1999 |
| JP | A 11-344667 | 12/1999 |
| JP | A 2003-066333 | 3/2003 |
| JP | A 2003-161884 | 6/2003 |
| JP | A 2003-322798 | 11/2003 |

(Continued)

*Primary Examiner*—Lee Fineman
(74) *Attorney, Agent, or Firm*—Oliff & Berridge, PLC

(57) ABSTRACT

It is an object to provide a zoom microscope of a simple structure which can expand a variable-power range. In order to achieve the object thereof, the zoom microscope includes a replaceable infinity correction objective lens, an aperture stop, an afocal zoom system, and an imaging optical system which are arranged in this order from a specimen side. Further, the aperture stop is disposed on or near a rear focal plane of the objective lens.

1 Claim, 30 Drawing Sheets

FOREIGN PATENT DOCUMENTS

| | | |
|---|---|---|
| JP | A 2004-133341 | 4/2004 |
| JP | A 2004-170697 | 6/2004 |
| JP | A 2004-184825 | 7/2004 |
| JP | A 2004-309621 | 11/2004 |
| JP | A 2004-361778 | 12/2004 |
| JP | A 2006-084825 | 3/2006 |

* cited by examiner

ZOOM MICROSCOPE

CROSS REFERENCE TO RELATED APPLICATION

This is a Division of application Ser. No. 11/288,383 filed Nov. 29, 2005, the entire disclosure of which is incorporated herein by reference in its entirety. This application is based upon and claims the benefit of priority from Japanese Patent Applications Nos. 2004-344039 and 2004-344086, both filed on Nov. 29, 2004, and No. 2005-193126, filed on Jun. 30, 2005, the entire contents of which are incorporated herein by reference.

BACKGROUND

1. Field of the Invention

The present invention relates to a zoom microscope used for vertical observation and acquisition of a specimen image.

2. Description of the Related Art

A known zoom microscope is structured by combining a zoom imaging lens with an infinity correction objective lens (see, for example, Japanese Unexamined Patent Application Publication No. Hei 6-18784). In this structure, observation magnification of a specimen image is arbitrarily variable by moving a variable-power lens group in the zoom imaging lens in an optical axis direction.

Further, it has been proposed that a zoom microscope is structured by attaching an infinity correction zoom objective lens to a revolver of a typical microscope, thereby combining the zoom objective lens and an imaging lens of the microscope (see, for example, Japanese Unexamined Patent Application Publication No. 2004-133341). In such a structure, observation magnification of a specimen image is arbitrarily variable by moving a variable-power lens group in the zoom objective lens in an optical axis direction.

However, intended variable-power ranges of both of the aforesaid zoom microscopes are narrow, and they do not include a low variable power, for example, (about 0.5 to about 2). The expansion of the variable-power range (for example, to the low-power side) is desirable, however, it is difficult for the zoom microscope of the former document to set the position of an entrance pupil of the objective lens at infinity over the entire variable-power range since a pupil of the objective lens is in the zoom imaging lens and the position of the pupil of the zoom imaging lens moves due to the power variation. On the other hand, in the zoom microscope of the latter document a pupil is located between an objective lens portion and a zoom portion (including the variable-power lens group) in the zoom objective lens, so that it is possible to provide a plurality of zoom objective lenses of different variable-power ranges, and expand the variable-power range by selectively attaching them to the revolver. However, there is a disadvantage that the provision of the zoom portion for each zoom objective lens results in increasing the scale of the device substantially.

SUMMARY

It is an object of the present invention to provide a zoom microscope of a simple structure which can expand a variable-power range.

A zoom microscope of the present invention includes a replaceable infinity correction objective lens, an aperture stop, an afocal zoom system, and an imaging optical system which are arranged in this order, seen from a specimen side. The aperture stop is disposed on or near a rear focal plane of the objective lens.

Preferably, the afocal zoom system has a variable-power lens group movable in an optical axis direction, and the aperture stop has a stop diameter that is variable in accordance with the movement of the variable-power lens group.

Preferably, the zoom microscope further includes a coaxial epi-illuminator provided between the afocal zoom system and the imaging optical system to form an image of a light source on or near the aperture stop.

Preferably, the zoom microscope further includes a holding member replaceably holding the objective lens, and the aperture stop is disposed on an image side of the holding member.

Preferably, a focal length f of the afocal zoom system when combined with the imaging optical system, and a maximum image height Y max in the lower-power end state satisfy a following conditional expression.

$$0.05 < Y\mathrm{max}/fL < 0.16$$

Preferably, the zoom microscope further includes an optical member for phase contrast observation that is removably inserted between the objective lens and the afocal zoom system.

Preferably, the zoom microscope further includes a fluorescence epi-illuminator provided between the objective lens and the afocal zoom system.

Preferably, the objective lens is plural in number and the plural objective lenses are different from each other in magnification, and distances from abutting joint surfaces of the plural objective lenses to the rear focal plane are substantially same.

Preferably, the optical member for phase contrast observation is common to the plural objective lenses.

Preferably, the optical member for phase contrast observation is a birefringence optical member for differential interference contrast observation.

Another zoom microscope of the present invention includes: a replaceable infinity correction objective lens; an optical member for phase contrast observation removably inserted on or near a rear focal plane of the objective lens; an afocal zoom system; an aperture stop disposed on or near an entrance pupil plane of the afocal zoom system; and an imaging optical system disposed on an image side of the afocal zoom system.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DETAILED DESCRIPTION OF EMBODIMENTS

Hereinafter, embodiments of the present invention will be described in detail with reference to the drawings.

First Embodiment

Figure 1:
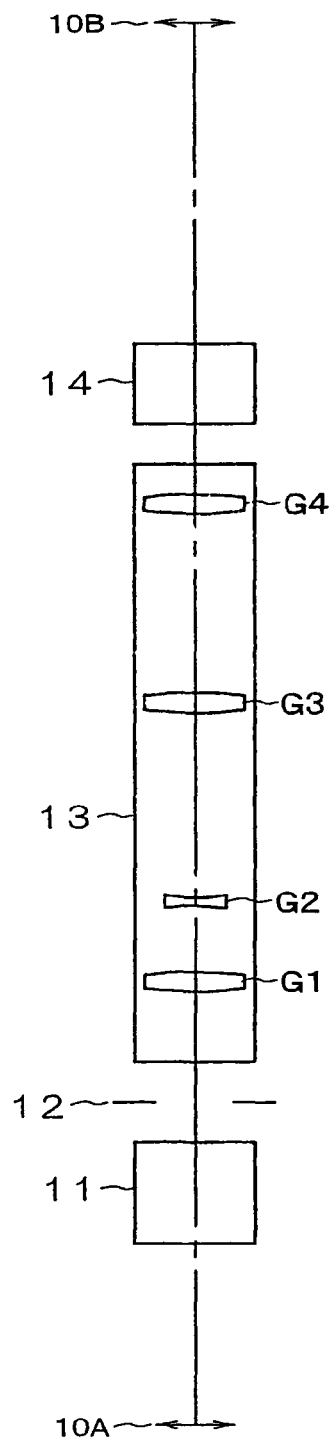
FIG. 1 is a view showing a whole configuration of a zoom microscope 10 of a first embodiment.

A zoom microscope 10 of a first embodiment has an objective lens 11, an aperture stop 12, an afocal zoom system 13, and an imaging optical system 14, which are arranged in this order from a specimen 10A side as shown in FIG. 1. Ray bundles emitted from respective points of the specimen 10A are turned to parallel ray bundles via the objective lens 11, are variably magnified via the afocal zoom system 13, and are collected via the imaging optical system 14 to reach an image plane 10B.

In order to observe an image of the specimen 10A formed on the image plane 10B, an image sensor, for example, a CCD or the like is disposed on the image plane 10B. Alternatively, instead of the imaging optical system 14, an observation binocular tube (eyepiece tube), a phototube, a trinocular tube for observation and photographing, or the like which includes an equivalent imaging optical system can be disposed according to an intended use. The use of the zoom microscope 10 of the first embodiment enables vertical observation and image acquisition of the specimen 10A.

Further, in the zoom microscope 10 of the first embodiment, the afocal zoom system 13 is composed of a first lens group G1 with a positive refractive power, a second lens group G2 with a negative refractive power, a third lens group G3 with a positive refractive power, and a fourth lens group G4 with a weak positive refractive power, which are arranged in this order from the specimen 10A side. The second lens group G2 and the third lens group G3 are variable-power groups. Therefore, by moving the variable-power lens groups (G2, G3) in an optical axis direction while fixing the first lens group G1 and the fourth lens group G4, it is possible to arbitrarily vary magnification for observing the image of the specimen 10A. The observation magnification is determined by a ratio of focal length of the objective lens 11 and focal length of the afocal zoom system 13 (combined with the imaging optical system 14).

Further, the objective lens 11 is of an infinity correction type, and a rear focal plane of the objective lens 11 is located on an image side of its lens plane nearest to the image side (between the objective lens 11 and the afocal zoom system 13). The aperture stop 12 is disposed on the rear focal plane (or near the rear focal plane) of the objective lens 11. Therefore, the position of an object-side entrance pupil of the objective lens 11 is infinite (telecentric), and principal rays of the ray bundles emitted from the respective points of the specimen 10A enter the objective lens 11 in parallel to the optical axis direction.

Further, setting the position of the aperture stop 12 as the position of an entrance pupil of the afocal zoom system 13 also makes it possible to set the position of the entrance pupil of the objective lens 11 at infinity in the entire variable-power range even when the aforesaid variable-power lens groups (G2, G3) are moved for power variation. In short, irrespective of a variable power by the afocal zoom system 13, telecentricity on the object side of the objective lens 11 can be maintained.

Figure 38:
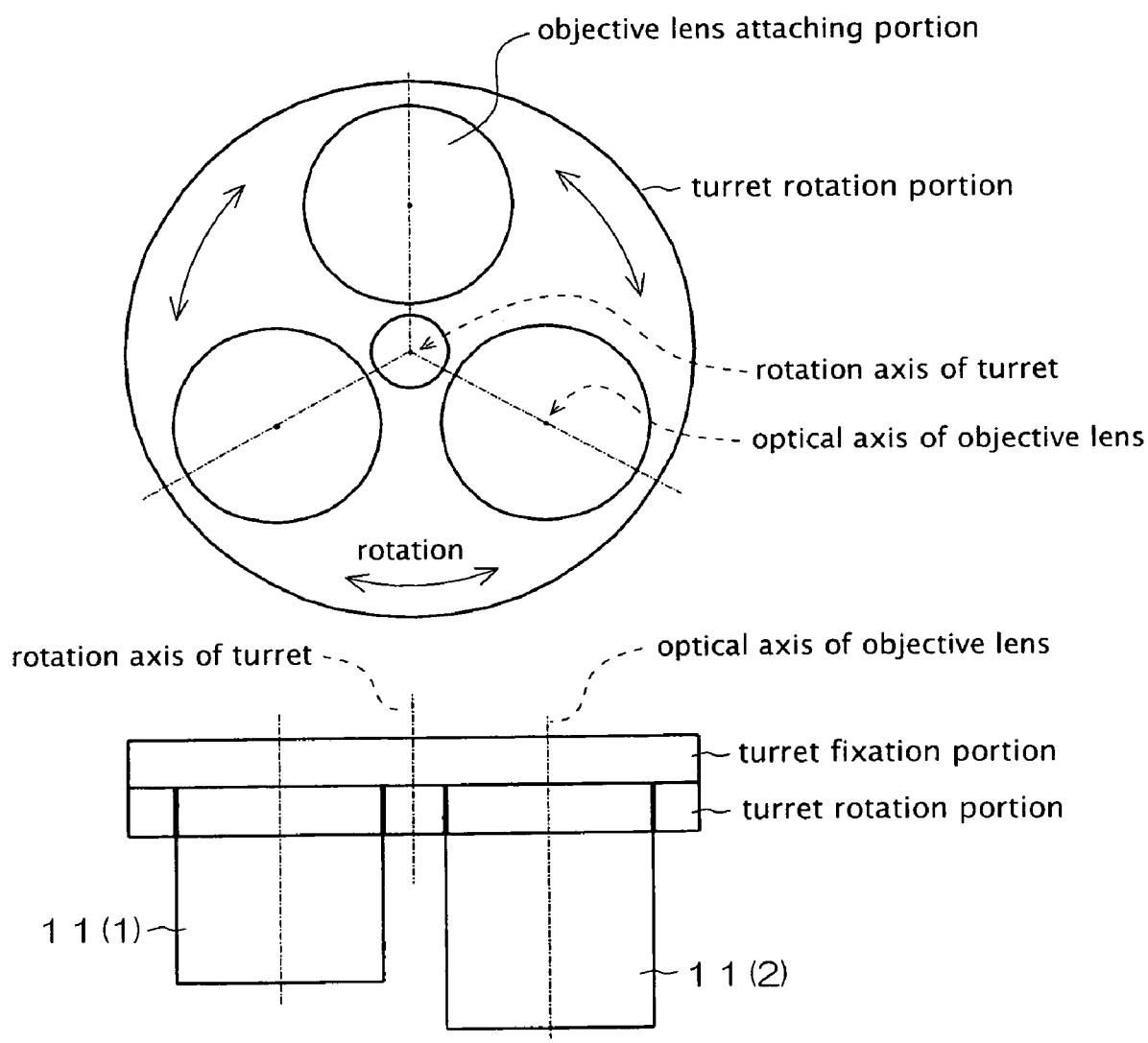
FIG. 38 is a view showing the objective lens attached to a turret.

Moreover, in the zoom microscope 10 of the first embodiment, the objective lens 11 is replaceably attached to a slider or turret (revolver) as shown in FIG. 38. A turret rotation portion is rotatably attached to a turret fixation portion. Specifically, plural kinds of the objective lenses 11 (for example, a low-power objective lens 11(1), a high-power objective lens 11(2) shown in FIGS. 2 and 38, and so on) are attached to the turret, and the kind of the objective lens 11 is changeable by the rotation (sliding) of the turret.

Further, in the zoom microscope 10 of the first embodiment, the distances from abutting joint surfaces (surfaces attached to the turret) of the respective objective lenses 11 to the rear focal plane are equal. Therefore, even when the objective lens 11 is replaced, it is possible to coincide the rear focal plane of the objective lens 11 (or the vicinity thereof) and an arrangement plane of the aperture stop 12 with each other while the aperture stop 12 is kept fixed. It is also possible to maintain the state in which the arrangement plane of the aperture stop 12 and the position of the entrance pupil of the afocal zoom system 13 coincide with each other.

Therefore, even when the objective lens 11 is replaced, telecentricity on the object side of the objective lens 11 can be maintained irrespective of the variable-power state (i.e., the positions of the variable-power lens groups G2, G3) by the afocal zoom system 13.

When the low-power objective lens 11(1) is disposed on the optical axis of the afocal zoom system 13, it is possible to change the magnification for observing the image of the specimen 10A according to a ratio of focal length of the objective lens 11(1) and focal length of the afocal zoom system 13 (combined with the imaging optical system 14) while maintaining telecentricity on the object side of the objective lens 11(1). Likewise, when the high-power objective lens 11(2) is disposed on the optical axis of the afocal zoom system 13, it is possible to change the magnification for observing the image of the specimen 10A according to a ratio of focal length of the objective lens 11(2) and the focal length of the afocal zoom system 13 (combined with the imaging optical system 14), while maintaining telecentricity on the object side of the objective lens 11(2).

A range of the observation magnification (variable-power range) will be described assuming that, for example, the focal length of the low-power (1×) objective lens 11(1) is 100 mm, the focal length of the high-power (4×) objective lens 11(2) is 25 mm, focal length of a very low-power (0.5×) objective lens (not shown) is 200 mm, and the focal length of the afocal zoom system 13 (combined with the imaging optical system 14) is 100 mm to 750 mm. When the very low-power objective lens is used, the variable-power range is 0.5 to 3.75. When the lower-power objective lens 11(1) is used, the variable-power range is 1 to 7.5. When the high-power objective lens 11(2) is used, the variable-power range is 4 to 30. The overall variable-power range is 0.5 to 30.

Figure 2:
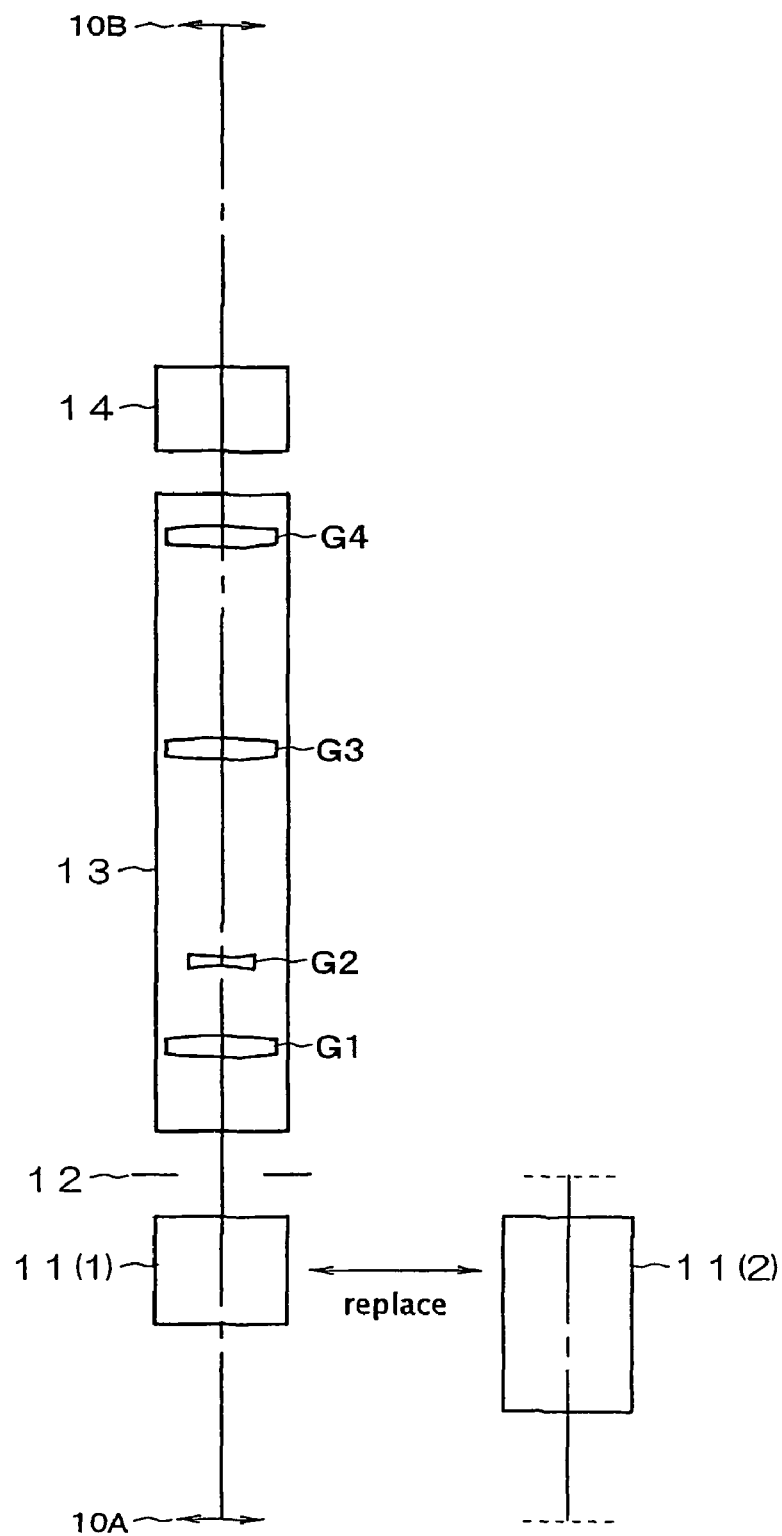
FIG. 2 is a view to illustrate the replacement of an objective lens 11.

Thus, in the zoom microscope 10 of the first embodiment, the replaceable objective lenses 11 (see the objective lenses 11(1), 11(2) in FIG. 2) share the afocal zoom system 13, and the variable-power range is shifted by the replacement of the objective lenses 11, so that it is possible to expand the variable-power range with a simple structure (i.e., only one afocal zoom system 13).

The use of the very low-power objective lens (for example, 0.5× objective lens) as one of the replaceable objective lenses 11 makes it possible to expand the variable-power range up to a very low variable-power range (about 0.5 to about 2) with a simple structure. In this case, the zoom microscope 10 functions as a "macrozoom microscope", so that macro observation of the specimen 10A also is made possible. The macro observation refers to observing a relatively large specimen 10A such as, for example, a metal specimen and a mechanical part (such as a gear). In order to respond to a change in thickness of the specimen 10A, the whole observation optical system from the objective lens 11 to the imaging optical system 14 is vertically moved.

Further, in the zoom microscope 10 of the first embodiment, it is possible to ensure telecentricity on the object side irrespective of the variable-power state of the afocal zoom system 13 (i.e., the positions of the variable-power lens groups (G2, G3)) even when the objective lens 11 is replaced, as has been described above. Therefore, in the macro observation of the specimen 10A selectively using the low-power objective lens while moving the variable-power lens groups (G2, G3), it is similarly possible to ensure telecentricity on the object side.

Further, in the zoom microscope 10 of the first embodiment, telecentricity on the object side of the objective lens 11 can be ensured in the whole wide variable-power range (for example, a power range from 0.5 to 30), which enables coaxial epi-illumination free of vignetting.

Further, in the zoom microscope 10 of the first embodiment, it is possible to realize a diversity of observation methods in a wide variable-power range (also in a low variable-power range) by inserting a coaxial epi-illuminator, a fluorescence epi-illuminator, a phototube, or the like in front of or at the back of the afocal zoom system 13 (i.e., between the objective lens 1 and the afocal zoom system 13, or between the afocal zoom system 13 and the imaging optical system 14). Note that when the specimen 10A to be observed is transparent, a transilluminator is disposed under the specimen 10A (opposite the objective lens 11).

Further, in the zoom microscope 10 of the first embodiment, inserting an optical member for phase contrast observation between the objective lens 11 and the aperture stop 12 enables phase contrast observation (for example, differential interference contrast observation or the like) of the specimen 10A with varied low powers. Such a configuration will be concretely described later in a fifth embodiment to a seventh embodiment.

Figure 3:
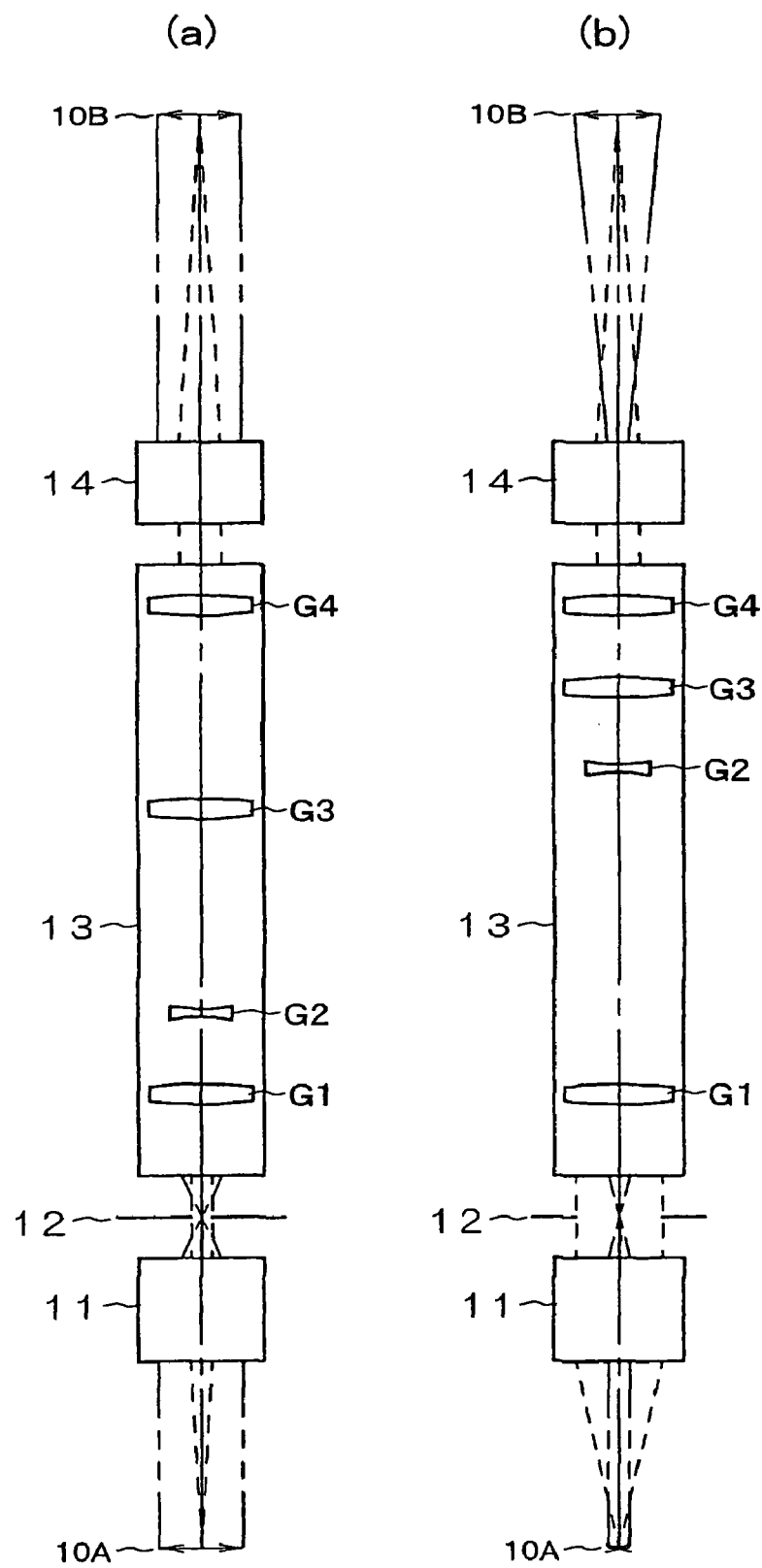
FIG. 3($a$) and FIG. 3($b$) are views to illustrate a change in stop diameter of an aperture stop 12, comparing a low-power state (a) and a high-power state (b) of an afocal zoom system 13.

Further, in the zoom microscope 10 of the first embodiment, it is preferable to use a variable aperture stop as the aperture stop 12, thereby making stop diameter thereof variable according to the movement of the variable-power lens groups (G2, G3) of the afocal zoom system 13 (see FIG. 3(a) and FIG. 3(b)). In FIG. 3(a) and FIG. 3(b), among the ray bundles emitted from the respective points of the specimen 10A, a center ray bundle is shown by the broken lines, and peripheral principal rays nearest to the image are shown by the two-dot chain lines. Note that not only the principal rays shown in the drawing but also not-shown principal rays are parallel to the optical axis direction, so that telecentricity on the object side of the objective lens 11 is ensured.

FIG. 3(a) shows a state where the lens groups (G2, G3) are moved to a low-power side. By reducing the stop diameter of the aperture stop 12 in conjunction with this movement, it is possible to restrict an opening angle of the center ray bundle to a small value. In this case, the observation of a deep focal depth and a wide field of view is possible with low NA. FIG. 3(b) shows a state where the lens groups (G2, G3) are moved to a high-power side. By increasing the stop diameter of the aperture stop 12 in conjunction with this movement, it is possible to widen the opening angle of the center ray bundle. In this case, high-resolution observation with high NA is possible.

Further, in the zoom microscope 10 of the first embodiment, it is preferable that the second lens group G2 of the afocal zoom system 13 satisfies the following conditional expression (1). The conditional expression (1) shows a desirable range of a magnification $\beta L2$ of the second lens group G2 in a low-power end state (see, for example, FIG. 3(a)).

$$-0.1 < \beta 2L < -0.3 \tag{1}$$

$\beta 2L$ under the lower limit value of the conditional expression (1) is not desirable since it results in a large movement amount of the second lens group G2, which leads to increase and complication of a mechanism for moving the variable-power lens groups (G2, G3). In order to reduce the movement amount of the second lens group G2 under the same condition, the refractive power of the second lens group G2 has to be made high, which makes difficult aberration correction in a screen peripheral portion. On the other hand, $\beta 2L$ over the upper limit value results in a large interval between the second lens group G2 and the third lens group G3 on the lower-power side. Accordingly, entrance height of peripheral ray bundles entering the third group G3 is high, which leads to size increase of the third lens group G3 and thus is not desirable. Therefore, by satisfying the conditional expression (1), it is possible to downsize the afocal zoom system 13, in particular, to set the movement amount of the second lens group G2 to an appropriate value, thereby achieving downsizing of the third lens group G3.

Further, in the zoom microscope 10 of the first embodiment, it is preferable that the third lens group G3 of the afocal zoom system 13 satisfies the following conditional expression (2). The conditional expression (2) shows a desirable range of a magnification $\beta 3L$ of the third lens group G3 in the low-power end state (see, for example, FIG. 3(a)).

$$-0.01 < 1/\beta 3L < -0.04 \tag{2}$$

$1/\beta 3L$ below the lower limit value of the conditional expression (2) results in a high refractive power of the third lens group G3, which makes difficult aberration correction in the screen peripheral portion on the low-power side. On the other hand, $1/\beta 3L$ over the upper limit value of the conditional expression (2) is not desirable since it results in a low refractive power of the third lens group G3 and thus the entrance height of the peripheral ray bundles entering the fourth lens group G4 is high, leading to size increase of the fourth lens group G4. Therefore, satisfying the conditional expression (2) makes it possible to downsize the afocal zoom system 13, in particular, to achieve downsizing of the fourth lens group G4 and good optical performance in the screen peripheral portion on the low-power side.

Further, in the zoom microscope 10 of the first embodiment, the focal length of the afocal zoom system 13 (combined with the imaging optical system 14) and the maximum image height preferably satisfy the following conditional expression (3). The conditional expression (3) shows a desirable range of a ratio of the focal length fL of the afocal zoom system 13 (combined with the imaging optical system 14) and the maximum image height Y max, in the lower-power end state.

$$0.05 < Y\max/fL < 0.16 \tag{3}$$

The ratio below the lower limit value of the conditional expression (3) results in a long focal length of the afocal zoom system 13 (combined with the imaging optical system 14) relative to the maximum image height, in the low-power end state. This is not desirable because this in turn increases the focal length of the very low-power (0.5×) objective lens, leading to size increase of a zoom microscope system when it is used for very low magnification observation. On the other hand, the ratio over the upper limit value of the conditional expression (3) is not desirable since it results in a large angle at which the peripheral ray bundles closest to the image enter the afocal zoom system 13 on the low-power side, leading to size increase of the third lens group G3 and the fourth lens group G4, and in addition, leading to difficulty in aberration correction of the screen peripheral portion. Therefore, by satisfying the conditional expression (3), it is possible to downsize the zoom microscope system used for the very low-magnification observation and to achieve good optical performance in the screen peripheral portion on the low-power side.

Next, concrete configurations of the objective lens 11, the afocal zoom system 13, and the imaging optical system 14 in the zoom microscope 10 of the above-described first embodiment will be described.

Figure 4:
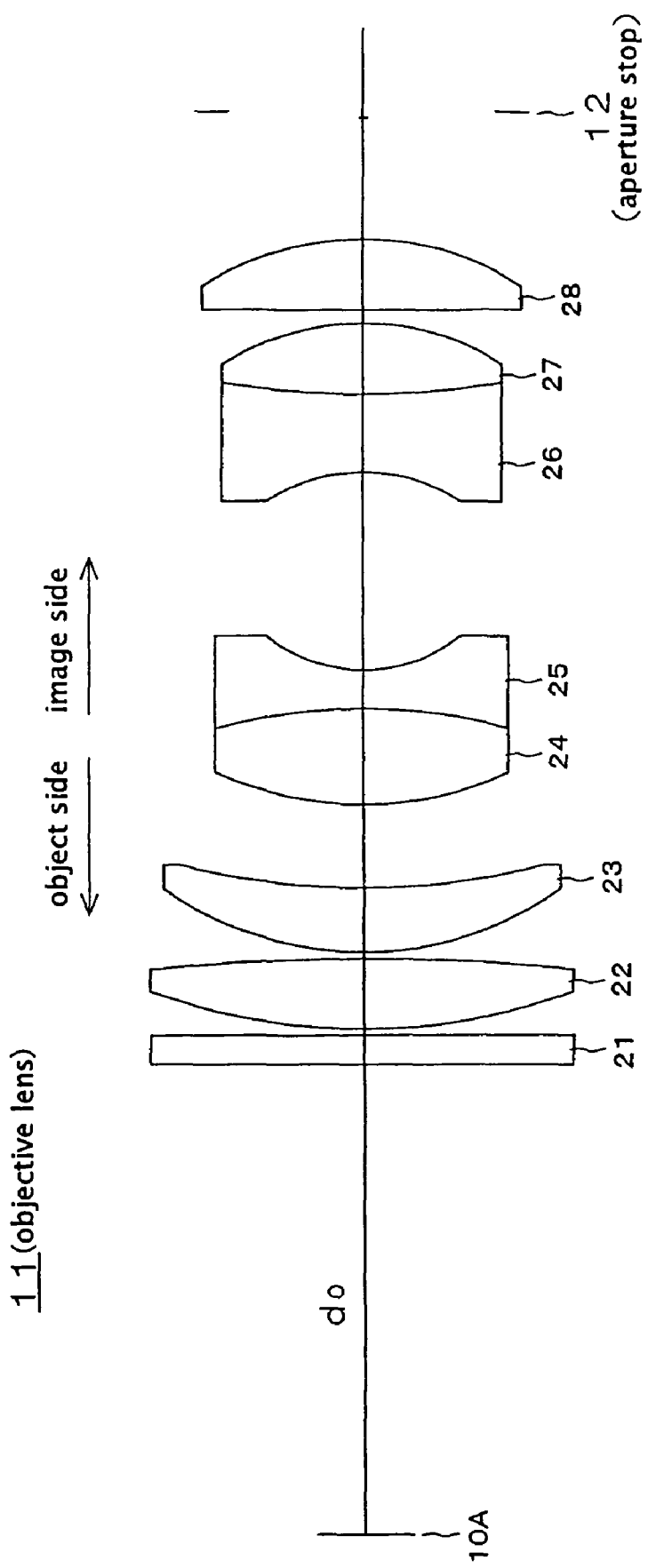
FIG. 4 is a view showing an example of a concrete configuration of the objective lens 11.

As shown in FIG. 4, in the objective lens 11, a flat plate glass 21, a biconvex lens 22, a positive meniscus lens 23 having a convex surface on the object side, a cemented lens of a biconvex lens 24 and a biconcave lens 25, a cemented lens of a biconcave lens 26 and a biconvex lens 27, and a biconvex lens 28 are arranged in this order from the object side (the left side of the drawing). The magnification of the objective lens 11 is 1×. When the coaxial epi-illumination is assumed, a quarter wavelength plate is used as the flat plate glass 21. In a case where the coaxial epi-illumination is not assumed, a dummy glass (protective glass) is preferably used as the flat plate glass 21.

Table 1 shows examples of various initial values of the objective lens 11 shown in FIG. 4.

TABLE 1

| | f = 100 | | | |
|---|---|---|---|---|
| NO. | r | d | v | n |
| 0 | | 36.0131 | | 1.000000 |
| 1 | 0.0000 | 2.2500 | 64.14 | 1.516330 |
| 2 | 0.0000 | 0.5000 | | 1.000000 |
| 3 | 44.9980 | 5.5000 | 68.33 | 1.592400 |
| 4 | −154.7100 | 0.5000 | | 1.000000 |
| 5 | 25.2310 | 5.0000 | 68.33 | 1.592400 |
| 6 | 53.2220 | 6.5000 | | 1.000000 |
| 7 | 25.4730 | 7.5000 | 82.52 | 1.497820 |
| 8 | −40.2700 | 3.0000 | 52.32 | 1.754998 |
| 9 | 11.2760 | 15.2500 | | 1.000000 |
| 10 | −12.8730 | 6.0000 | 46.57 | 1.804000 |
| 11 | 59.7860 | 5.5000 | 82.52 | 1.497820 |
| 12 | −18.8950 | 1.0000 | | 1.000000 |
| 13 | 1128.3100 | 5.5000 | 68.33 | 1.592400 |
| 14 | −21.6003 | 10.0000 | | 1.000000 |
| 15 | SP | | | 1.000000 |

In Table 1, the surface number 0 corresponds to an object plane, the surface numbers 1 to 14 are numbers assigned to lens surfaces in order from the object side, and the surface number 15 corresponds to the aperture stop 12. Minus (−) of the radius of curvature (r) of each lens surface indicates that the lens surface is convex toward the image side. The plane interval (d) is lens thickness or air space on the optical axis. As for the others, v is Abbe number for the d-line (587 nm) and n is a refractive index for the d-line. The working distance do corresponds to an interval (=36.0131) from the object plane (0) to the lens surface (1) closest to the object side. The distance between the lens surface (12) closest to the image side and the aperture stop 12 is 10 mm. f represents the focal length of the objective lens 11.

Concrete examples of such an objective lens 11 will be further described later in an eighth embodiment to an eleventh embodiment. The objective lenses described in the eighth embodiment to the eleventh embodiment are infinity objective lenses with pupils protruding toward the image side in the above-described structure.

Figure 5:
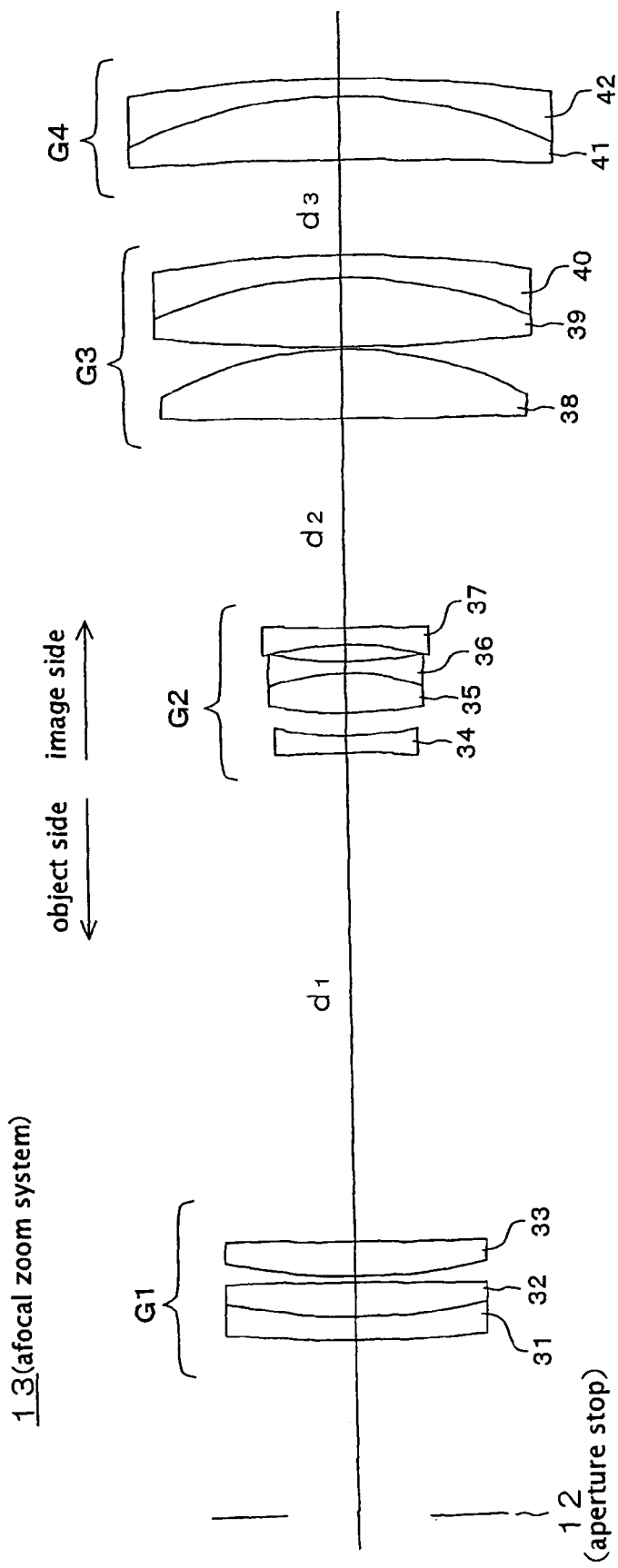
FIG. 5 is a view showing an example of a concrete configuration of the afocal zoom system 13.

Further, the afocal zoom system 13 is composed of the above-described four lens groups G1, G2, G3, G4 as shown in FIG. 5 (see FIG. 3(b) as well). The first lens group G1 is composed of: a cemented lens of a negative meniscus lens 31 having a concave surface on the object side and a biconvex lens 32; and a positive meniscus lens 33 having a convex surface on the object side. The second lens group G2 is composed of: a biconcave lens 34, a cemented lens of a positive meniscus lens 35 having a concave surface on object side and a biconcave lens 36; and a negative meniscus lens 37 having a concave surface on the object side. The third lens group G3 is composed of: a positive meniscus lens 38 having a concave surface on the object side; and a cemented lens of a biconvex lens 39 and a negative meniscus lens 40 having a concave surface on the object side. The fourth lens group G4 is composed of a cemented lens of a positive meniscus lens 41 having a concave surface on the object side and a negative meniscus lens 42 having a concave surface on the object side.

In the afocal zoom system 13 in FIG. 5, for power variation from the low-power end to the high-power end, the second lens group G2 is moved toward the image side while the first lens group G1 and the fourth lens group G4 are fixed, and the third lens group G3 is moved in a direction for correcting a focus shift ascribable to the movement of the second lens group G2 (see FIG. 3(a)→FIG. 3(b)). It is preferable to increase the stop diameter of the aperture stop 12 in conjunction with the power variation from the lower-power end to the high-power end of the afocal zoom system 13.

Table 2 shows examples of various original values of the afocal zoom system 13 and the aperture stop 12 shown in FIG. 5.

TABLE 2 cf = 100~750
Fno = 16.7~37.5

| NO. | r | d | v | n |
|---|---|---|---|---|
| | | d0' | | |
| 1 | SP | 15.0000 | | 1.000000 |
| 2 | 120.1967 | 2.0000 | 39.57 | 1.804400 |
| 3 | 48.7980 | 3.0000 | 82.56 | 1.497820 |
| 4 | −509.0866 | 0.5000 | | 1.000000 |
| 5 | 50.4610 | 3.0000 | 82.56 | 1.497820 |
| 6 | 3179.8129 | d1 | | 1.000000 |
| 7 | −108.0082 | 1.5000 | 35.71 | 1.902650 |
| 8 | 25.8194 | 2.0000 | | 1.000000 |
| 9 | 32.8474 | 3.5000 | 23.78 | 1.846660 |
| 10 | −19.0003 | 1.0000 | 60.29 | 1.620410 |
| 11 | 31.8448 | 1.5000 | | 1.000000 |

TABLE 2-continued cf = 100~750
Fno = 16.7~37.5

| 12 | −25.9839 | 1.5000 | 35.71 | 1.902650 |
|---|---|---|---|---|
| 13 | 228.2515 | d2 | | 1.000000 |
| 14 | 838.2380 | 6.0000 | 82.56 | 1.497820 |
| 15 | −31.9728 | 0.2000 | | 1.000000 |
| 16 | 136.9685 | 6.0000 | 82.56 | 1.497820 |
| 17 | −39.2120 | 2.0000 | 28.55 | 1.795040 |
| 18 | −92.0449 | d3 | | 1.000000 |
| 19 | −339.8016 | 5.5000 | 36.24 | 1.620040 |
| 20 | −40.8020 | 1.5000 | 39.57 | 1.804400 |
| 21 | −124.4210 | 8.5017 | | 1.000000 |
| 22 | PL | 0.0000 | | 1.000000 |

| Fai | 6.0000 | 12.0000 | 20.0000 |
|---|---|---|---|
| f | 100.0000 | 250.0000 | 750.0000 |
| D0 | 0.0000 | 0.0000 | 0.0000 |
| d1 | 2.6024 | 42.4730 | 60.3676 |
| d2 | 22.8372 | 18.1594 | 2.5051 |
| d3 | 43.3588 | 8.1659 | 5.9257 |

In Table 2, the surface number 1 corresponds to the aperture stop 12, the surface numbers 2 to 21 are numbers assigned to lens surfaces in order from the object side, and the surface number 22 corresponds to a lens-tube abutting joint surface. The distance between the lens surface (2) closest to the object side and the aperture stop 12 is 15 mm. f represents the focal length of the whole lens system when the distance from the object plane to the aperture stop 12 is expressed as do'=∞. Fno represents F number and fai represents the stop diameter of the aperture stop 12.

Values corresponding to the aforesaid conditional expressions (1), (2) are as follows.

$$\beta 2L = -0.217 \quad (1)$$

$$1/\beta 3L = 0.008 \quad (2)$$

$$Y\max/fL = 0.110 \quad (3)$$

Figure 6:
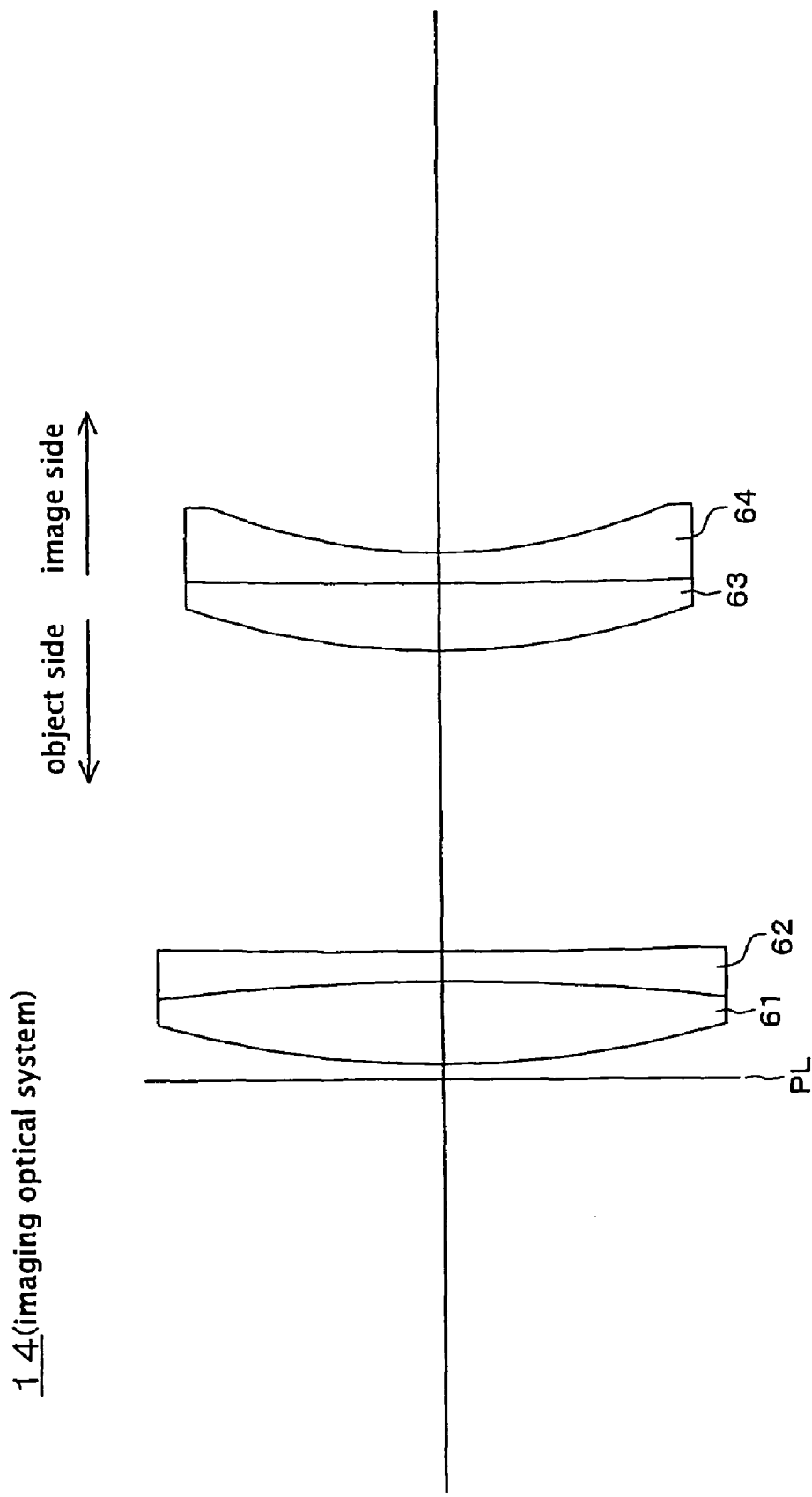
FIG. 6 is a view showing an example of a concrete configuration of an imaging optical system 14.

The imaging optical system 14 is composed of four lenses 61 to 64 as shown in FIG. 6. Table 3 shows examples of various original values of the imaging optical system 14 shown in FIG. 6. In Table 3, the surfaced number 1 corresponds to a lens-tube abutting joint surface (PL), the surface numbers 2 to 7 are numbers assigned to lens surfaces in order from the object side. The distance between the surface closest to the object side and the lens-tube abutting joint surface (PL) is 1 mm. f represents the focal length of the imaging optical system 14 and Bf represents the distance between the plane closest to the image side and the image plane.

TABLE 3 f = 250
Bf = 186.0354

| NO. | r | d | v | n |
|---|---|---|---|---|
| 1 | PL | 1.0000 | | 1.000000 |
| 2 | 63.3425 | 5.5000 | 68.33 | 1.592400 |
| 3 | −156.8517 | 2.0000 | 28.56 | 1.795040 |
| 4 | 712.2356 | 20.0000 | | 1.000000 |
| 5 | 46.5880 | 4.5000 | 37.90 | 1.723421 |
| 6 | 708.2065 | 2.0000 | 49.45 | 1.772789 |
| 7 | 36.4262 | Bf | | 1.000000 |

Figure 7:
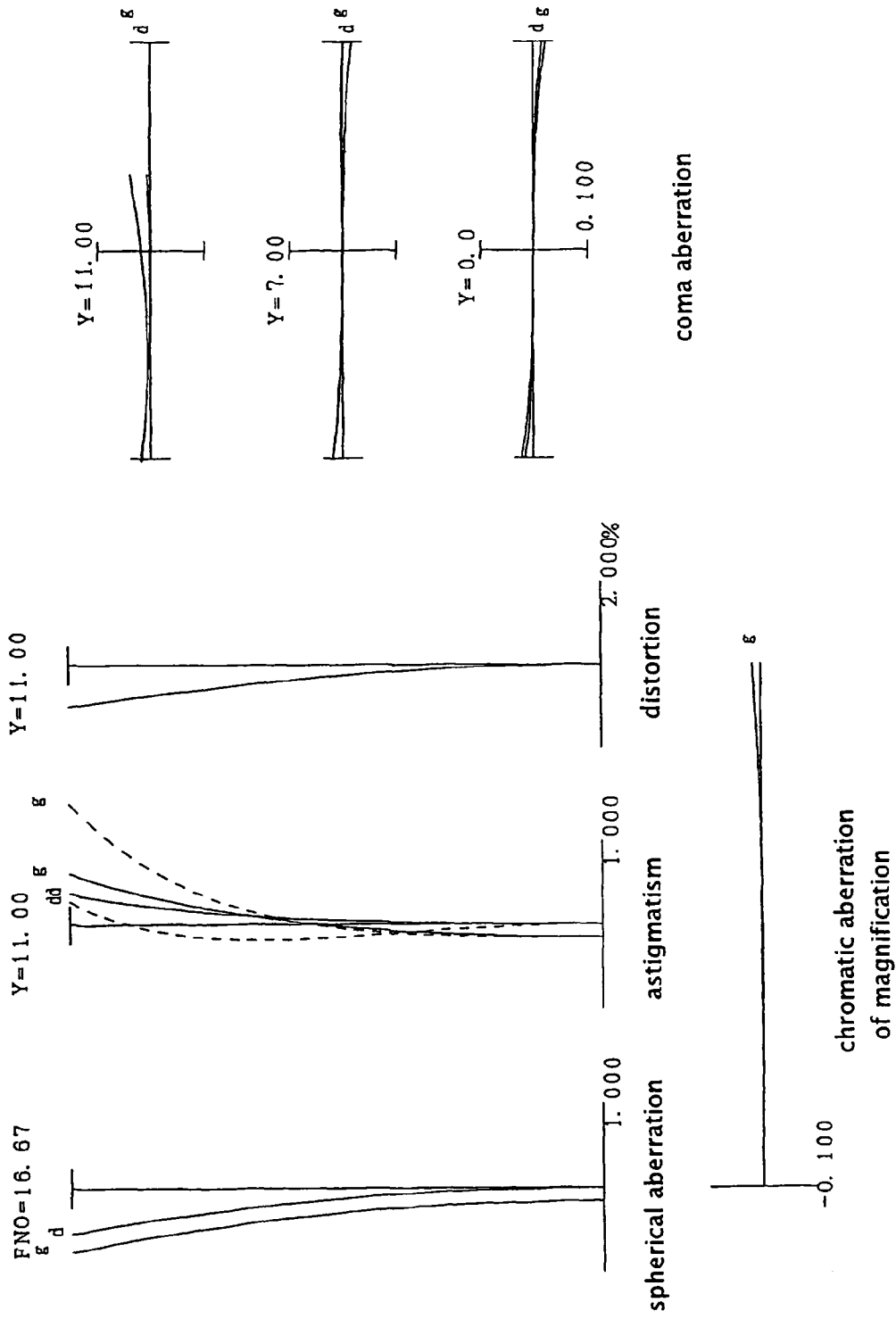
FIG. 7 is a view showing various aberrations when the zoom microscope 10 is in a low-power end state.
Figure 8:
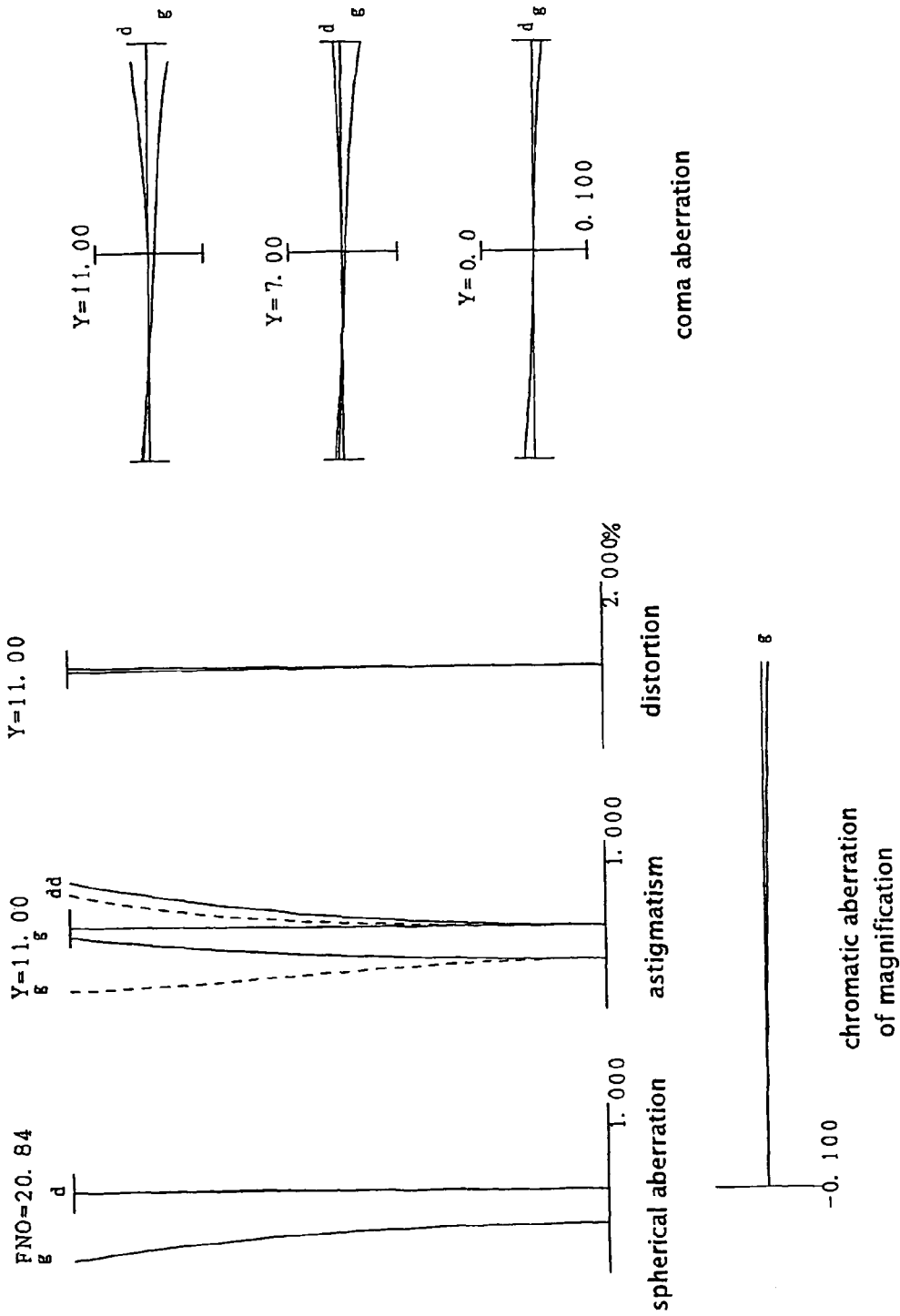
FIG. 8 is a view showing various aberrations when the zoom microscope 10 is in a mid-power state.
Figure 9:
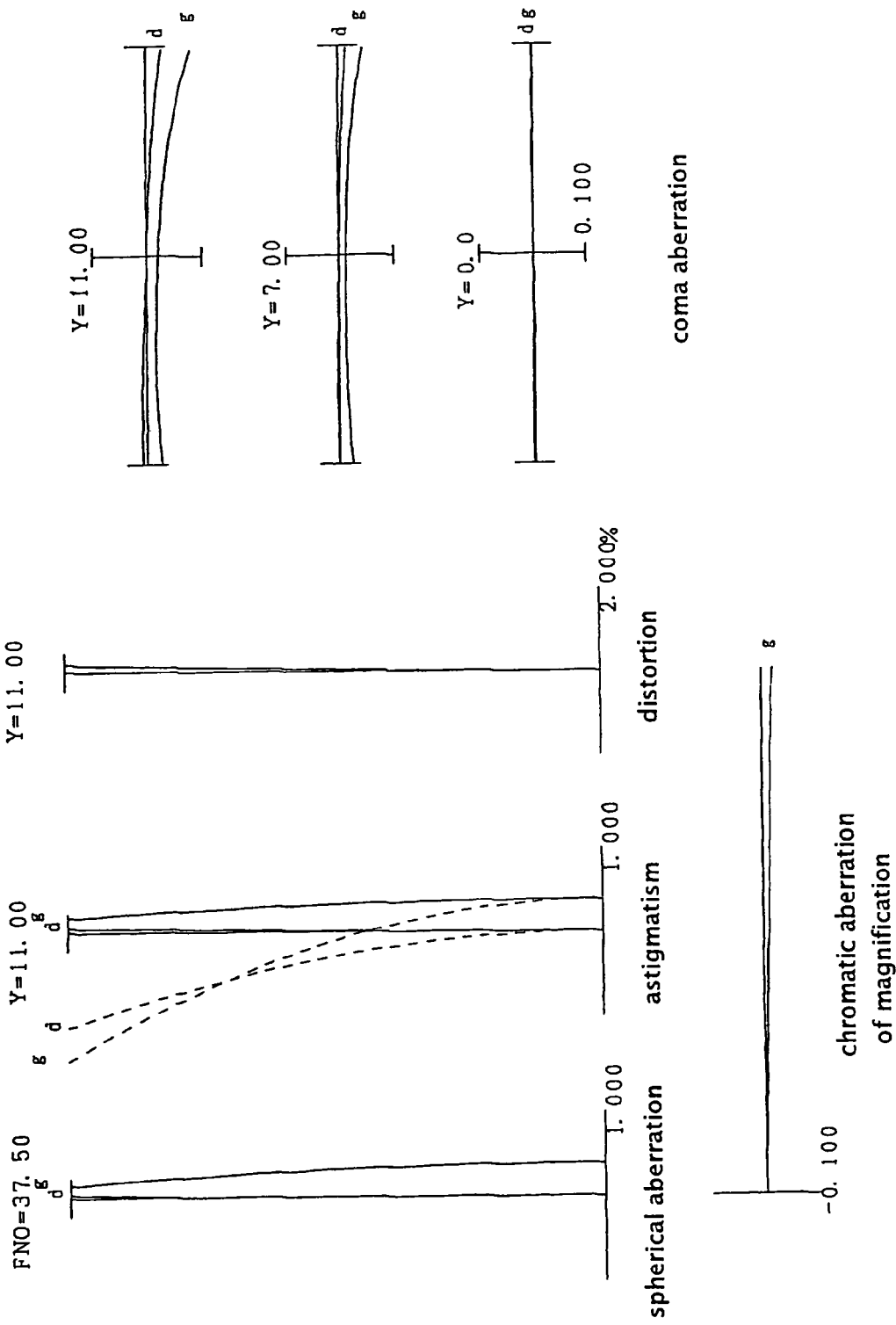
FIG. 9 is a view showing various aberrations when the zoom microscope 10 is in a high-power end state.

FIG. 7 to FIG. 9 show various aberrations (spherical aberration, astigmatism, distortion aberration, chromatic aberration of magnification, and coma aberration) regarding the zoom microscope 10 including the focal zoom system 13 and the aperture stop 12 based on the various original values in Table 2 and the imaging optical system 14 based on the various original values in Table 3. FIG. 7 corresponds to the low-power end state (f=100), FIG. 8 to the mid-power state (f=250), and FIG. 9 to the high-power end state (f=750). In FIG. 7 to FIG. 9, Fno represents F number, Y represents image height, d represents the d-line ($\lambda$=587 nm), and g represents the g-line ($\lambda$=436 nm). As is apparent from the drawings, various aberrations are well corrected in the zoom microscope 10 of the first embodiment.

Second Embodiment

Figure 10:
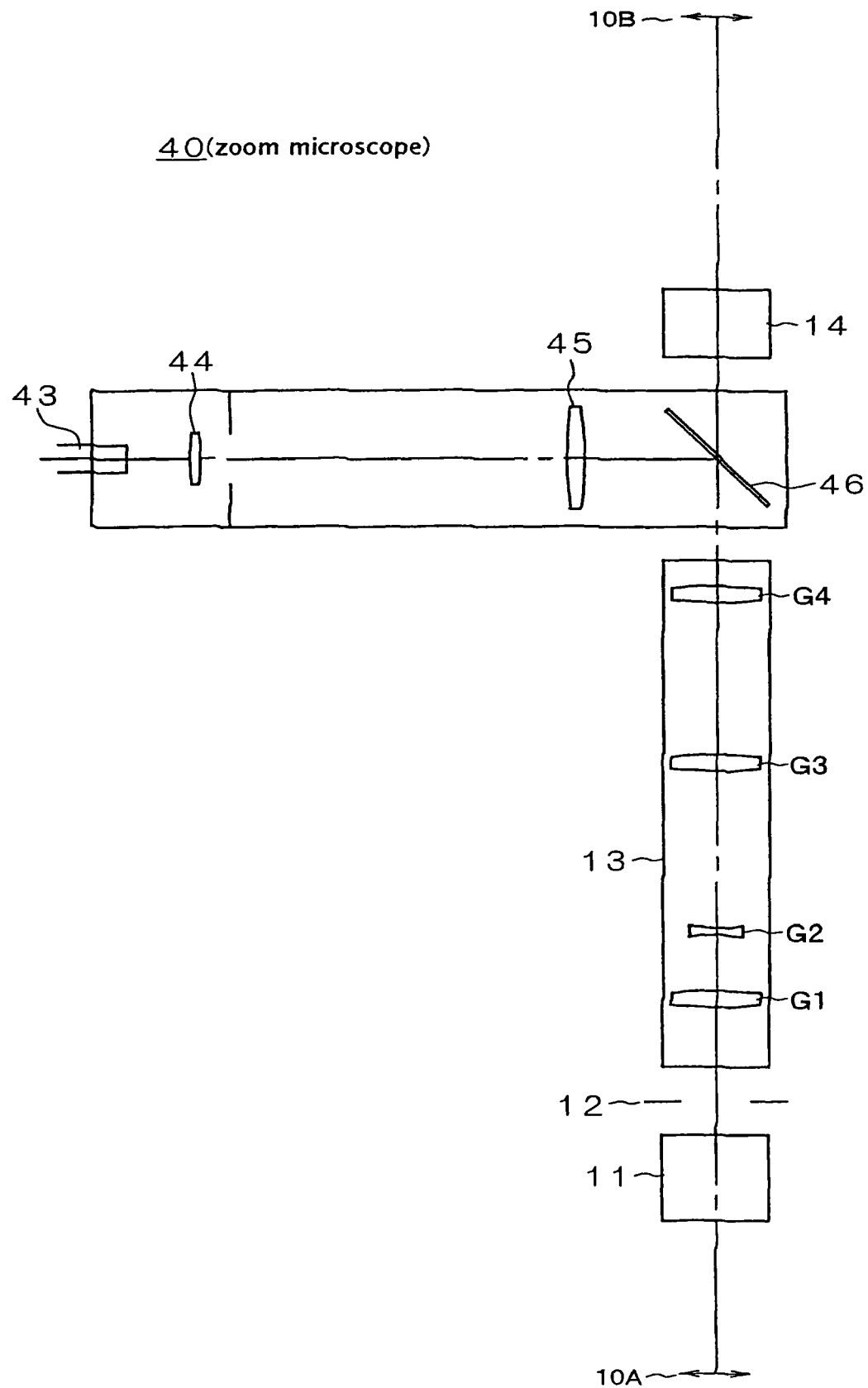
FIG. 10 is a view showing a whole configuration of a zoom microscope 40 of a second embodiment.

A zoom microscope 40 of a second embodiment is configured such that a coaxial epi-illuminator (43 to 46) is provided between the afocal zoom system 13 and the imaging optical system 14 of the zoom microscope 10 (FIG. 1) of the first embodiment, as shown in FIG. 10. The zoom microscope 40 is used for vertical observation (image acquisition) of a transparent specimen 10A in industrial application.

In the coaxial epi-illuminator (43 to 46), an outgoing ray bundle from a fiber light source 43 is led to the afocal zoom system 13 via a collector lens 44, a relay lens 45, and a beam splitter 46 to reach the aperture stop 12 via the afocal zoom system 13. At this time, an image of a light source (end-face image of the fiber light source 43) is formed on the aperture stop 12 (or near the aperture stop 12) by the coaxial epi-illuminator (43 to 46).

Thereafter, the ray bundle that has passed through the aperture stop 12 enters the specimen 10A via the objective lens 11. A principal ray of the ray bundle directed toward the specimen 10A from the objective lens 11 becomes parallel to an optical axis direction, since, as described above, the rear focal plane of the objective lens 11 is located near the aperture stop 12 and telecentricity on the object side of the objective lens 11 can be ensured in the whole wide variable-power range (for example, a power range from 0.5 to 30). In short, illumination for the specimen 10A is coaxial epi-illumination (so-called telecentric illumination) free of vignetting.

This allows good bright-field observation of the transparent specimen 10A. In particular, when macro observation in a low-power range (about 0.5 to about 2) is carried out, poor telecentricity on the object side is not desirable since it causes the principal ray in a screen peripheral portion (ray passing through the center of a pupil) to pass through a pupil plane at a larger angle, which causes vignetting in the illumination in a field of view. In the zoom microscope 40 of this embodiment, telecentricity on the object side can be ensured even in the low-power range, which enables good macro observation by the coaxial epi-illumination free of vignetting.

Further, in the zoom microscope 40 of this embodiment, the coaxial epi-illuminator (43 to 46) is provided between the afocal zoom system 13 and the imaging optical system 14 to illuminate the specimen 10A via the afocal zoom system 13 (in other words, the afocal zoom system 13 is shared by an illumination system and an observation system), so that it is possible to change an illuminated range in conjunction with a change in an observation range of the specimen 10A at the time of the power variation. Therefore, efficient coaxial epi-illumination is achieved.

Third Embodiment

Figure 11:
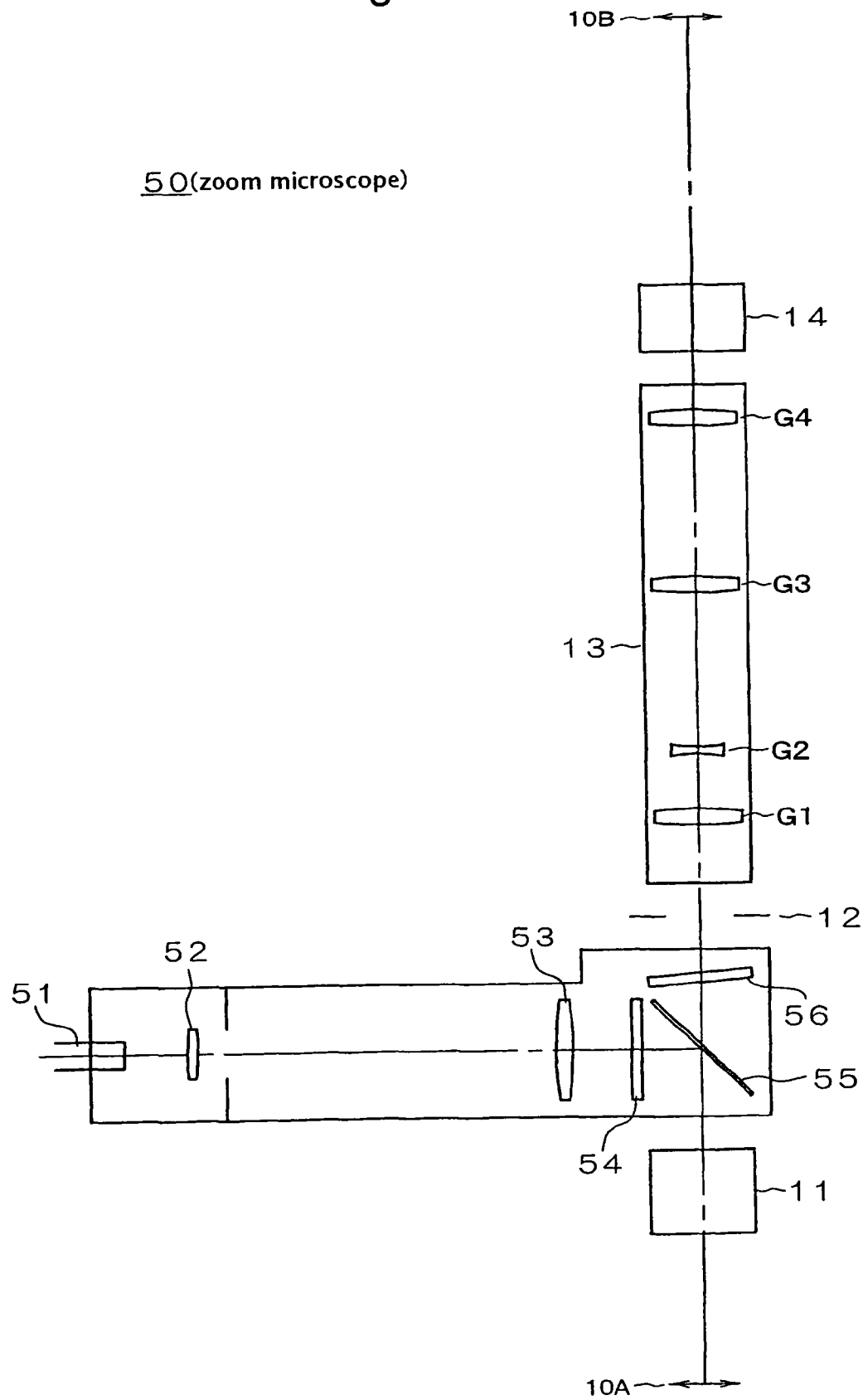
FIG. 11 is a view showing a whole configuration of a zoom microscope 50 of a third embodiment.

A zoom microscope 50 of a third embodiment is configured such that a fluorescence epi-illuminator (51 to 56) is provided between the objective lens 11 and the aperture stop 12 of the zoom microscope 10 (FIG. 1) of the first embodiment, as shown in FIG. 11. The zoom microscope 50 is used for vertical observation (image acquisition) based on feeble light from a specimen 10A such as a biospecimen marked by a fluorescent substance.

In the fluorescence epi-illuminator (51 to 56), an outgoing ray bundle from a fiber light source 51 enters an excitation filter 54 via a collector lens 52, a relay lens 53, and a not-shown aperture stop. The excitation filter 54 transmits only a ray bundle (excitation light) in a wavelength band necessary for exciting the specimen 10A. The excitation light from the excitation filter 54 is led to the objective lens 11 via a dichroic mirror 55 to enter the specimen 10A via the objective lens 11.

Fluorescence emitted from the specimen 10A enters the aperture stop 12 via the objective lens 11, the dichroic mirror 55, and a barrier filter 56 and thereafter reaches an image plane 10B via the aperture stop 12, the afocal zoom system 13, and the imaging optical system 14. The fluorescence from the specimen 10A is feeble, and enters the dichroic mirror 55 together with unnecessary excitation light reflected on the specimen 10A, but the unnecessary excitation light is cut off when it passes through the dichroic mirror 55 and the barrier filter 56, so that only the feeble fluorescence can be led to the image plane 10B. This enables fluorescence observation of the specimen 10A in the whole wide variable-power range (for example, a power range from 0.5 to 30).

Further, in the zoom microscope 50 of this embodiment, the excitation light from the fluorescence epi-illuminator (51 to 56) passes only through the objective lens 11 in the observation optical system (from the objective lens 11 to the imaging optical system 14) and passes through neither of the afocal zoom system 13 and the imaging optical system 14. This can minimize self-fluorescence generated in each lens element of the observation optical system by the excitation light. As a result, fluorescence observation with good contrast is enabled.

Further, the fluorescence epi-illuminator (51 to 56) may be a zoom optical system. In this case, it is possible to change an illumination range of the excitation light and NA of illumination, which enables efficient fluorescence illumination appropriate for the variable-power range of the observation optical system. Moreover, mechanically linking a variable-power mechanism of the zoom optical system of the aforesaid epi-illuminator with a variable-power mechanism of the afocal zoom system 13 enables efficient fluorescence illumination appropriate for the variable-power range of the observation optical system by a single power-variation operation.

Note that in the zoom microscope 50 of this embodiment, telecentricity of the illumination is not necessary since the fluorescence emitted from the fluorescent substance in the specimen 10A irradiated with the excitation light is observed.

Fourth Embodiment

Here, an afocal zoom system 70 with a three-group structure will be described.

Figure 12:
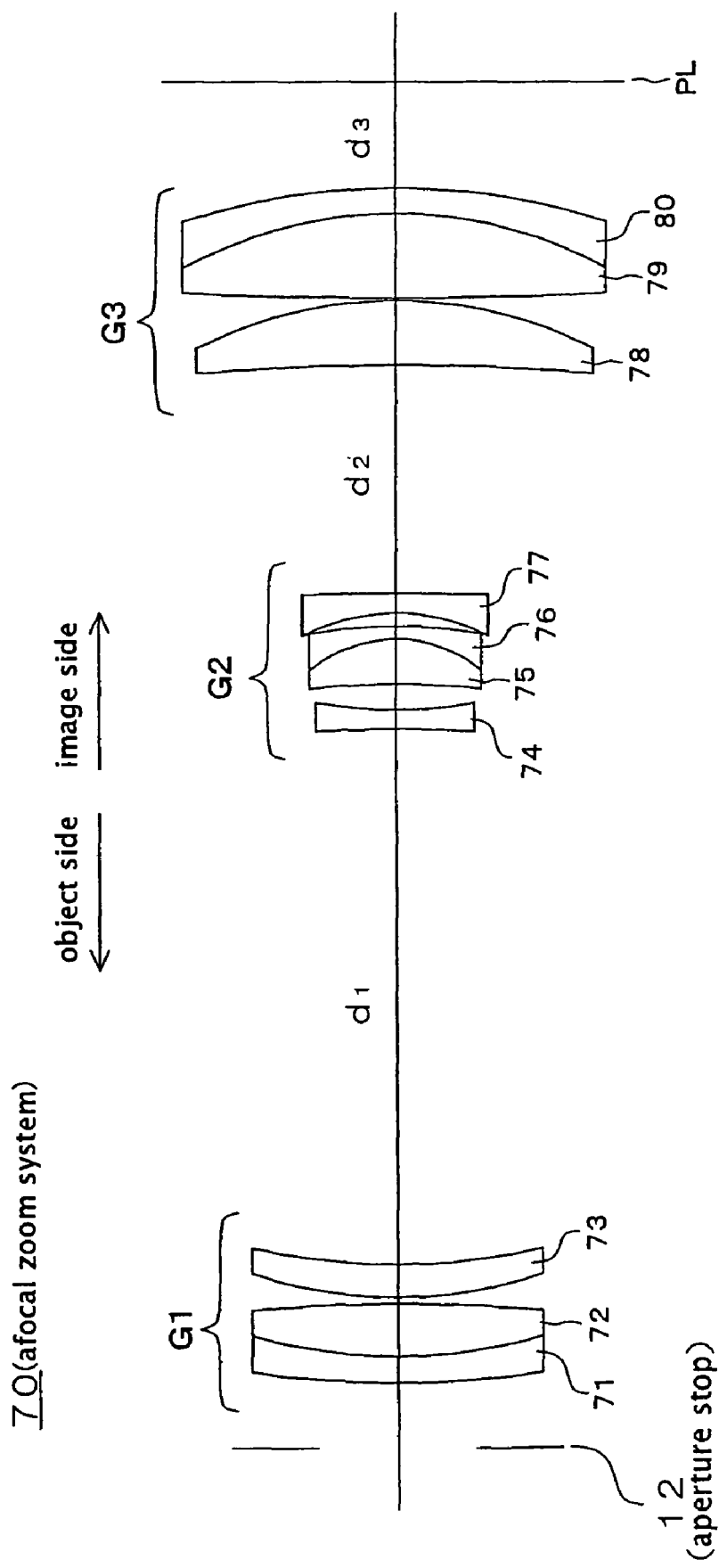
FIG. 12 is a view showing an example of a concrete configuration of an afocal zoom system 70 of a fourth embodiment.

The afocal zoom system 70 is composed of three lens groups G1, G2, G3 as shown in FIG. 12. Further, the first lens group G1 is composed of: a cemented lens of a negative meniscus lens 71 having a concave surface on an object side and a biconvex lens 72; and a positive meniscus lens 73 having a convex surface on the object side. The second lens group G2 is composed of: a biconcave lens 74; a cemented lens of a positive meniscus lens 75 having a concave surface on the object side and a negative meniscus lens 76 having a concave surface on the object side; and a negative meniscus lens 77 having a concave surface on the object side. The third lens group G3 is composed of: a positive meniscus lens 78 having a concave surface on the object side; and a cemented lens of a biconvex lens 79 and a negative meniscus lens 80 having a concave surface on the object side.

In the afocal zoom system 70 in FIG. 12, for power variation from a low-power end to a high-power end, the second lens group G2 is moved to an image side while the first lens group G1 is fixed, and the third lens group G3 is moved in a direction for correcting a focus shift ascribable to the movement of the second lens group G2. It is preferable to increase stop diameter of an aperture stop 12 in conjunction with the power variation from the low-power end to the high-power end of the afocal zoom system 70.

Table 4 shows examples of various original values of the afocal zoom system 70 and the aperture stop 12 shown in FIG. 12.

TABLE 4 f = 100~750
Fno = 16.7~37.5

| NO. | r | d | ν | n |
|---|---|---|---|---|
|  |  | d0 |  |  |
| 1 | SP | 5.0000 |  | 1.000000 |
| 2 | 76.4790 | 2.0000 | 39.57 | 1.804400 |
| 3 | 39.5970 | 4.0000 | 82.56 | 1.497820 |
| 4 | −122.2643 | 0.5000 |  | 1.000000 |
| 5 | 34.9517 | 2.5000 | 82.56 | 1.497820 |
| 6 | 49.3068 | d1 |  | 1.000000 |
| 7 | −88.4247 | 1.5000 | 35.71 | 1.902650 |
| 8 | 34.7688 | 2.0000 |  | 1.000000 |
| 9 | −61.3206 | 3.5000 | 23.78 | 1.846660 |
| 10 | −9.8577 | 1.0000 | 60.14 | 1.620409 |
| 11 | −35.4310 | 1.0000 |  | 1.000000 |
| 12 | −14.7762 | 1.5000 | 35.71 | 1.902650 |
| 13 | −225.5269 | d2 |  | 1.000000 |
| 14 | −172.9916 | 5.0000 | 82.56 | 1.497820 |
| 15 | −32.2107 | 0.2000 |  | 1.000000 |
| 16 | 369.6080 | 6.5000 | 82.56 | 1.497820 |
| 17 | −32.4550 | 2.0000 | 25.41 | 1.805182 |
| 18 | −49.6675 | d3 |  | 1.000000 |
| 19 | PL | 0.0000 |  | 1.000000 |
| Fai | 6.0000 | 12.0000 |  | 20.0000 |
| f | 100.0000 | 250.0000 |  | 750.0000 |
| D0 | 0.0000 | 0.0000 |  | 0.0000 |
| d1 | 3.4900 | 41.4700 |  | 58.3500 |
| d2 | 22.2244 | 17.5798 |  | 2.0979 |
| d3 | 41.5933 | 8.2579 |  | 6.8598 |

In Table 4, the surface number 1 corresponds to the aperture stop (SP) 12, the surface numbers 2 to 18 are numbers assigned to lens surfaces in order from the object side, and the surface number 19 corresponds to a lens-tube abutting joint surface (PL). The distance between the lens surface (2) closest to the object side and the aperture stop (SP) is 5 mm. f represents focal length of the whole lens system when the distance from the object plane to the aperture stop 12 is defined as $d_0=\infty$ and focal length of an imaging optical system is f=250 mm. Fno represents F number and fai represents the stop diameter of the aperture stop 12.

Values corresponding to the aforesaid conditional expressions (1), (2) are as follows.

$$\beta 2L = -0.221 \quad (1)$$

$$1/\beta 3L = 0.000 \quad (2)$$

$$Ymax/fL = 0.110 \quad (3)$$

Figure 13:
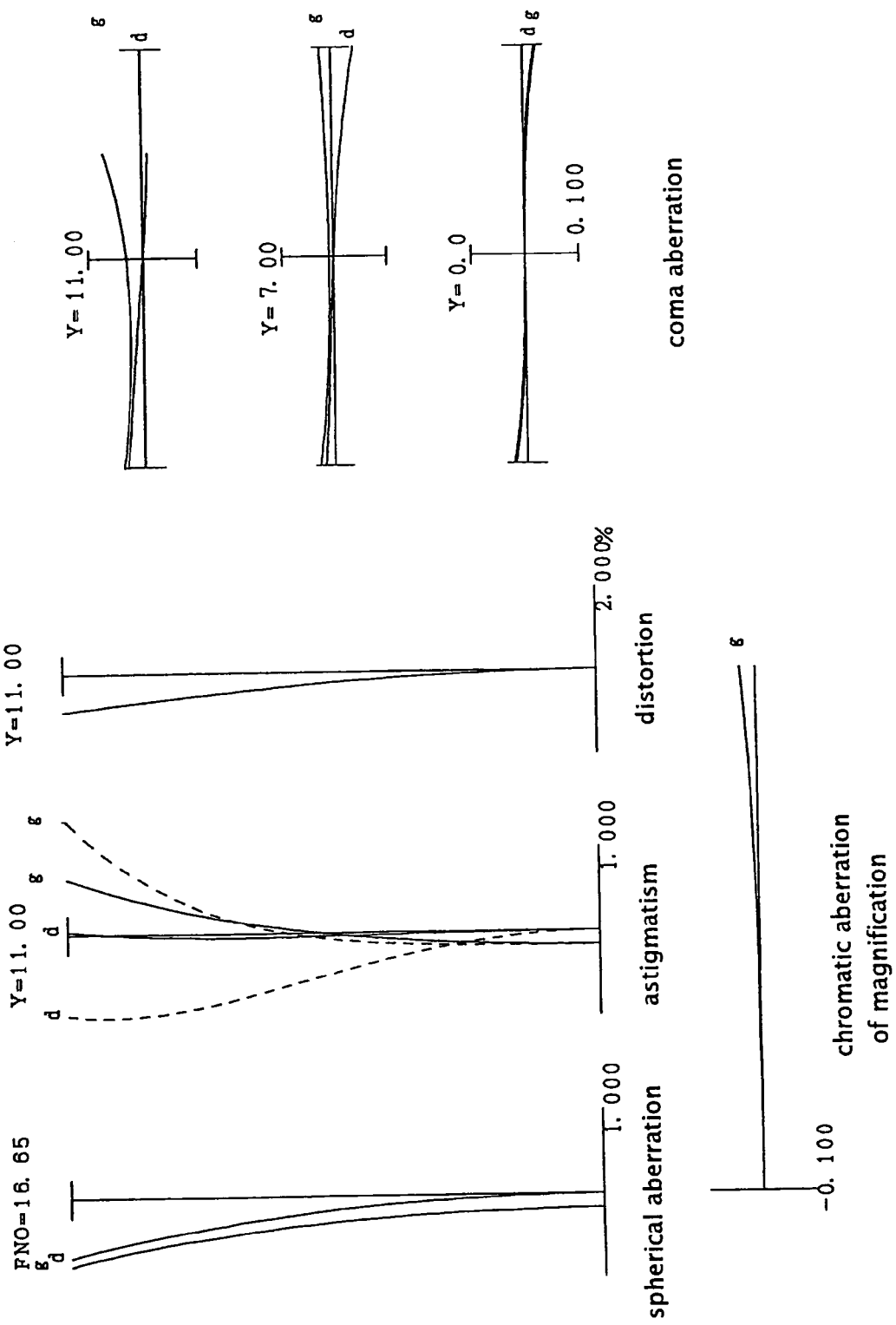
FIG. 13 is a view showing various aberrations when a zoom microscope including the afocal zoom system 70 is in a low-power end state.
Figure 14:
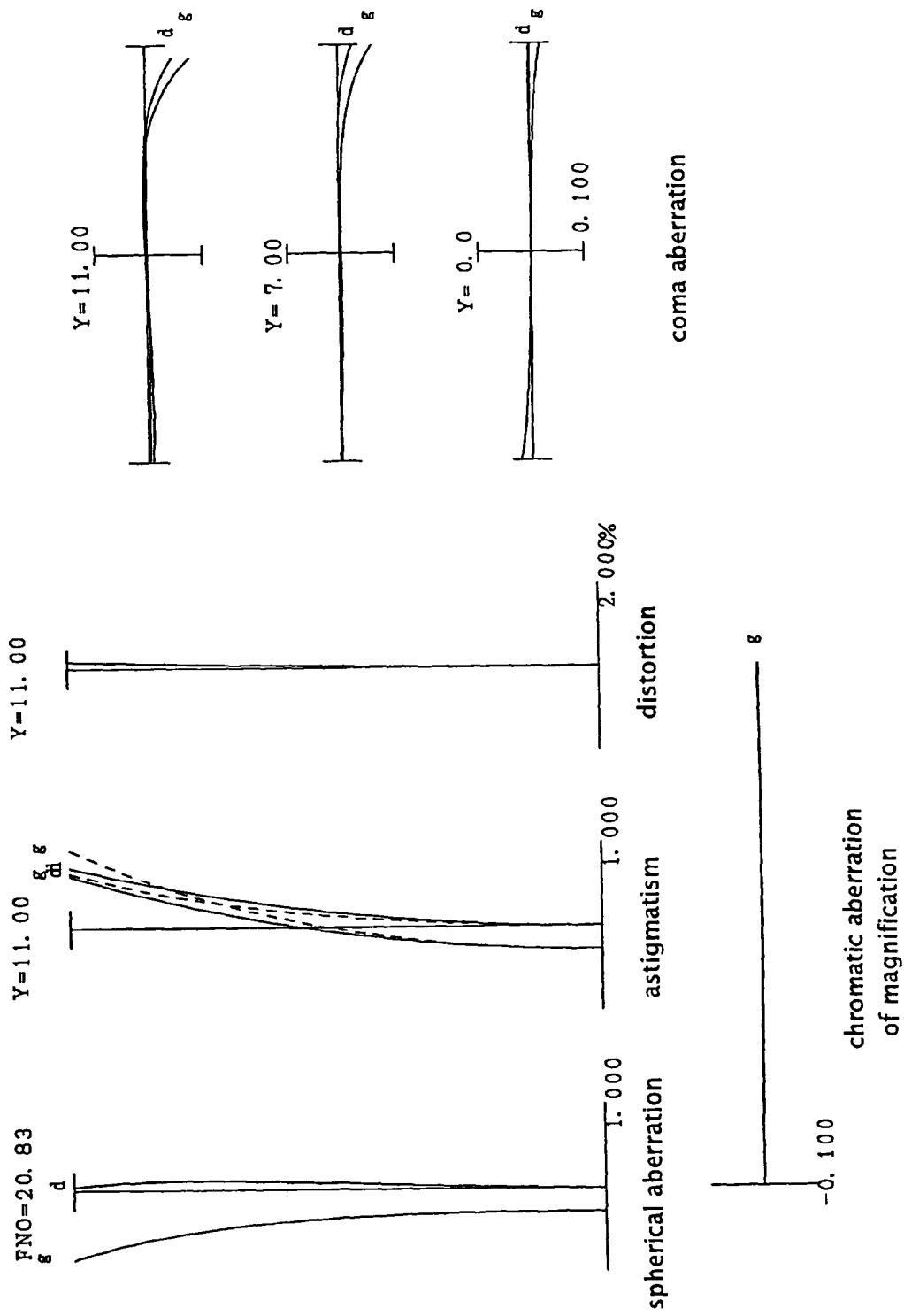
FIG. 14 is a view showing various aberrations when the zoom microscope including the afocal zoom system 70 is in a mid-power state.
Figure 15:
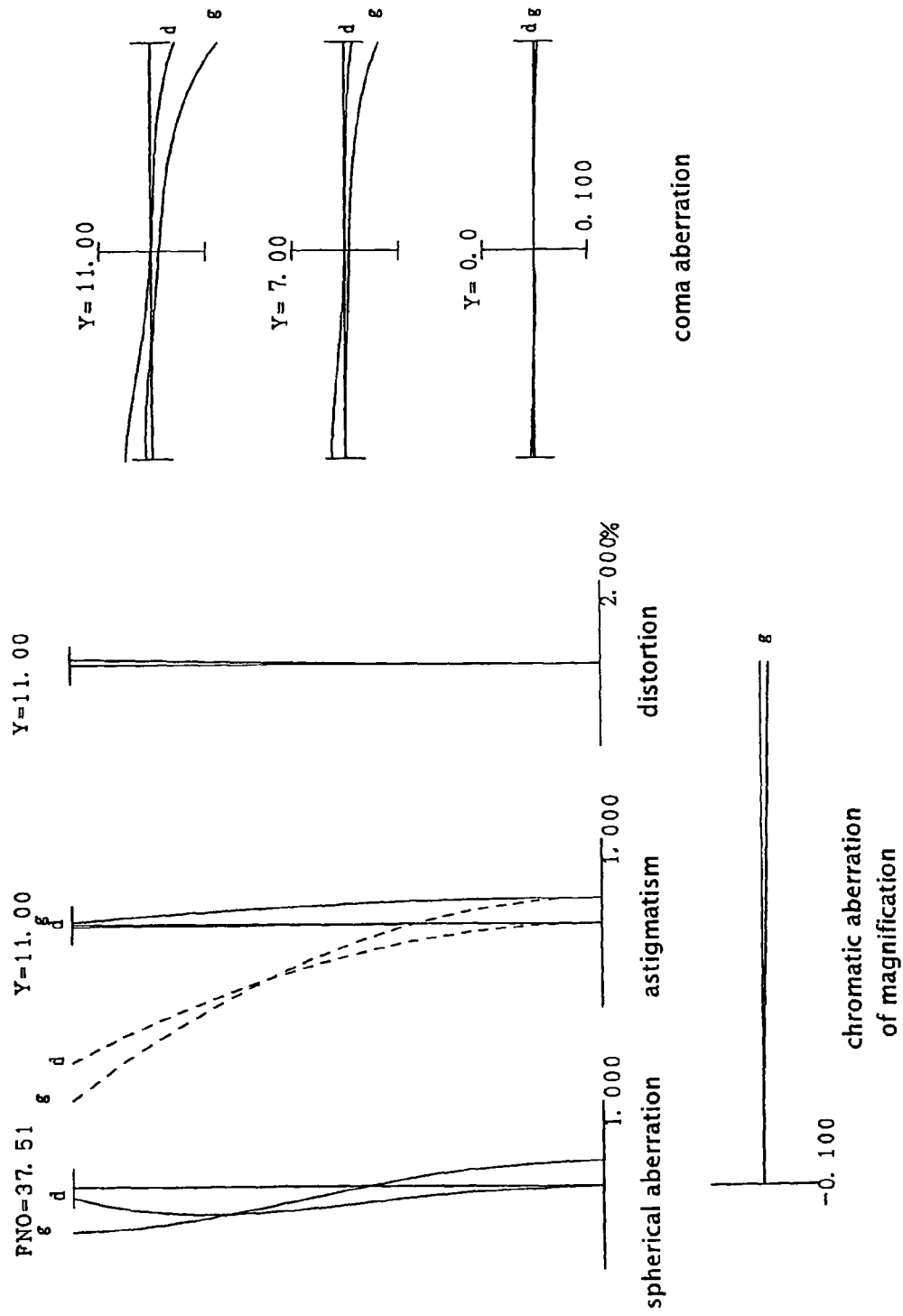
FIG. 15 is a view showing various aberrations when the zoom microscope including the afocal zoom system 70 is in a high-power end state.

FIG. 13 to FIG. 15 show various aberrations (spherical aberration, astigmatism, distortion aberration, chromatic aberration of magnification, and coma aberration) in a zoom microscope including the afocal zoom system 70 and the aperture stop 12 based on the various original values in Table 4 and the imaging optical system 14 based on the various original values in Table 3. FIG. 13 corresponds to a low-power end state (f=100), FIG. 14 to a mid-power state (f=250), and FIG. 15 to a high-power end state (f=750). As is apparent from the drawings, the various aberrations are well corrected in the zoom microscope including the three-group structure afocal zoom system 70.

Modification Example

Incidentally, the above embodiments have described the examples where the stop diameter of the aperture stop 12 is variable according to the movement of the variable-power lens groups (G2, G3), but the present invention is not limited thereto. The present invention is also applicable to a case where the variable-power lens groups (G2, G3) are moved while the stop diameter is kept fixed.

Further, the above embodiments have described the examples where the distances from the abutting joint surfaces of the respective objective lenses 11 to the rear focal plane are equal, but the present invention is not limited thereto. The present invention is also applicable to a case where the distance from the abutting joint surface to the rear focal plane is different depending on each objective lens 11. In this case, telecentricity on the object side can be maintained by moving the aperture stop 12 in the optical axis direction when the objective lens 11 is replaced.

Further, in the above-described second embodiment, the coaxial epi-illuminator (43 to 46) is provided between the afocal zoom system 13 and the imaging optical system 14, but the present invention is not limited thereto. The coaxial epi-illuminator (43 to 46) may be provided between the objective lens 11 and the afocal zoom system 13. In this case, flare and contrast deterioration due to self-fluorescence on the lens planes of the observation optical system can be reduced.

Further, in the above-described third embodiment, the fluorescence epi-illuminator (51 to 56) is disposed between the objective lens 11 and the aperture stop 12, but the present invention is not limited thereto. The fluorescence epi-illuminator (51 to 56) may be provided between the aperture stop 12 and the afocal zoom system 13, or may be provided between the afocal zoom system 13 and the imaging optical system 14. However, in a case of the fluorescence observation, noise components ascribable to the self-fluorescence on the lens planes need to be reduced, and therefore, the fluorescence epi-illuminator is preferably provided between the objective lens 11 and the afocal zoom system 13.

Fifth Embodiment

Figure 16:
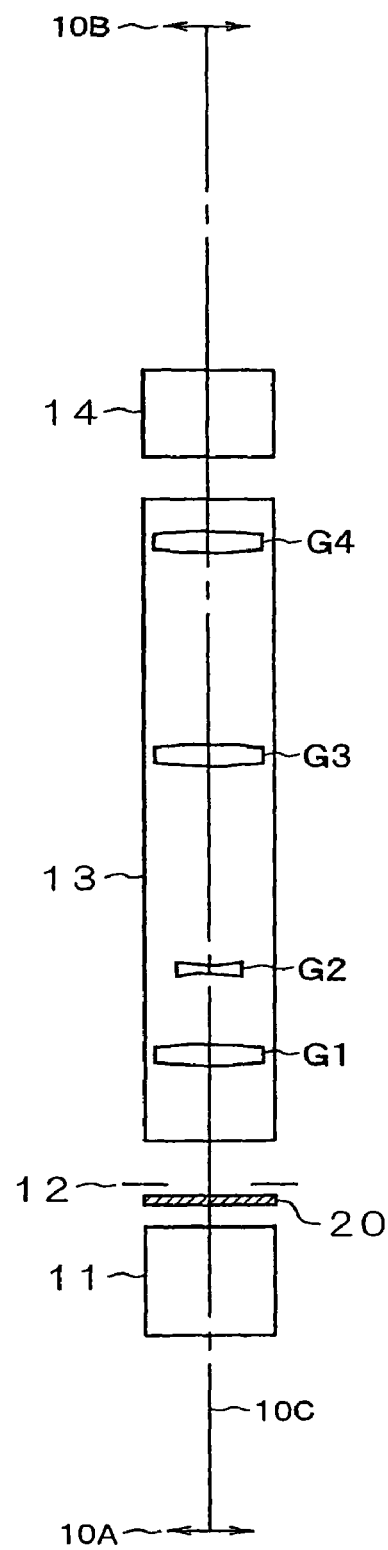
FIG. 16 is a view showing a whole configuration of a zoom microscope 10 of a fifth embodiment.

A zoom microscope 10 of a fifth embodiment has an objective lens 11, an optical member 20 for phase contrast observation, an aperture stop 12, an afocal zoom system 13, and an imaging optical system 14, which are arranged in this order from a specimen 10A side, as shown in FIG. 16. Ray bundles emitted from respective points of the specimen 10A are turned to parallel ray bundles via the objective lens 11, are variably magnified via the afocal zoom system 13, and are collected via the imaging optical system 14 to reach an image plane 10B.

In order to observe an image of the specimen 10A formed on the image plane 10B, an image sensor, for example, a CCD or the like is disposed on the image plane 10B. Alternatively, instead of the imaging optical system 14, an observation binocular tube (eyepiece tube), a phototube, a trinocular tube for observation and photographing, or the like which includes an equivalent imaging optical system can be disposed according to an intended use. The use of the zoom microscope 10 of the fifth embodiment enables vertical observation and image acquisition of the specimen 10A.

Further, in the zoom microscope 10 of the fifth embodiment, the optical member 20 for phase contrast observation is provided between the objective lens 11 and the aperture stop 12. The optical member 20 is insertable/removable to/from an observation optical path 10C of the zoom microscope 10. When the optical member 20 is inserted in the observation optical path 10C, a contrast image of the specimen 10A is formed on the image plane 10B. The contrast image is a contrasted fine structure of the specimen 10A. When the optical member 20 is removed from the observation optical path 10C, a bright-field image of the specimen 10A is formed on the image plane 10B.

Therefore, by inserting/removing the optical member 20 to/from the observation optical path 10C, it is possible to selectively perform contrast observation and bright-field observation of the specimen 10A. Note that the optical member 20 can be disposed at an arbitrary position between the objective lens 11 and the afocal zoom system 13. A desirable position is near the aperture stop 12.

Further, in the zoom microscope 10 of the fifth embodiment, the afocal zoom system 13 is composed of a first lens group G1 with a positive refractive power, a second lens group G2 with a negative refractive power, a third lens group G3 with a positive refractive power, and a fourth lens group G4 with a weak positive refractive power, which are arranged in this order from the specimen 10A side, and the second lens group G2 and the third lens group G3 are variable-power lens groups. Therefore, by moving the variable-power lens groups (G2, G3) in an optical axis direction while fixing the first lens group G1 and the fourth lens group G4, it is possible to arbitrarily vary magnification for observing the image (the contrast image or the bright-field image) of the specimen 10A. The observation magnification is determined by a ratio of a focal length of the objective lens 11 and a focal length of the afocal zoom system 13 (combined with the imaging optical system 14).

Further, the objective lens 11 is of an infinity correction type, and a rear focal plane of the objective lens 11 is located on an image side of its lens plane nearest to the image (between the objective lens 11 and the afocal zoom system 13). The aperture stop 12 is disposed on the rear focal plane (or near the rear focal plane) of the objective lens 11. Therefore, the position of an object-side entrance pupil of the objective lens 11 is infinity (telecentric), and principal rays of the ray bundles emitted from the respective points of the specimen 10A become parallel to the optical axis direction.

Further, setting the position of the aperture stop 12 as the position of an entrance pupil of the afocal zoom system 13 also makes it possible to set the position of the entrance pupil of the objective lens 11 at infinity in the whole variable-power range even when the aforesaid variable-power lens groups (G2, G3) are moved for power variation. In short, irrespective of a variable-power state by the afocal zoom system 13, telecentricity on the object side of the objective lens 11 can be maintained.

Moreover, in the zoom microscope 10 of the fifth embodiment, the objective lens 11 is replaceably attached to a slider or a turret (revolver as shown in FIG. 38). A turret rotation portion is rotatably attached to a turret fixation portion. Specifically, a plural kinds of the objective lenses 11 (for example, a low-power objective lens 11(1) and a high-power objective lens 11(2) shown in FIGS. 17, 38, and so on) different in magnification (different in focal length or numerical aperture) are attached to the turret, and the kind of the objective lens 11 can be changed by the rotation (sliding) of the turret.

In the structure where the objective lens 11 is replaced by using the turret, the turret is disposed between the objective lens 11 and the optical member 20. In order to secure a space for arranging the turret, a distance d from the objective lens 11 to the optical member 20 preferably satisfies the following conditional expression (4), where D is the distance from the objective lens 11 to the afocal zoom system 13.

$$d \geq D/2 \qquad (4)$$

Further, in the zoom microscope 10 of the fifth embodiment, the distances between abutting joint surfaces of the respective objective lenses 11 (surfaces attached to the turret) and the rear focal plane are substantially equal. Therefore, even when the objective lens 11 is replaced, it is possible to coincide the rear focal plane of the objective lens 11 (or the vicinity thereof) and an arrangement plane of the aperture stop 12 with each other while the aperture stop 12 is kept fixed. It is also possible to maintain the state in which the arrangement plane of the aperture stop 12 and the position of the entrance pupil of the afocal zoom system 13 coincide with each other.

Therefore, even when the objective lens 11 is replaced, telecentricity on the object side of the objective lens 11 can be maintained irrespective of the variable-power state (i.e., the positions of the variable-power lens groups G2, G3) of the afocal zoom system 13.

When the low-power objective lens 11(1) is disposed on the optical axis of the afocal zoom system 13, it is possible to change the magnification for observing the image (the contrast image or the bright-field image) of the specimen 10A according to a ratio of the focal length of the objective lens 11(1) and the focal length of the afocal zoom system 13 (combined with the imaging optical system 14), while maintaining telecentricity on the object side of the objective lens 11(1). Likewise, when the high-power objective lens 11(2) is disposed on the optical axis of the afocal zoom system 13, it is possible to change the magnification for observing the image (the contrast image or the bright-field image) of the specimen 10A according to a ratio of the focal length of the objective lens 11(2) and the focal length of the afocal zoom system 13 (combined with the imaging optical system 14), while maintaining telecentricity on the object side of the objective lens 11(2).

A range of the observation magnification (variable-power range) will be described assuming that, for example, the focal length of the low-power (1×) objective lens 11(1) is 100 mm, the focal length of the high-power (4×) objective lens 11(2) is 25 mm, the focal length of a very low-power (0.5×) objective lens (not shown) is 200 mm, and the focal length of the afocal zoom system 13 (combined with the imaging optical system 14) is 100 mm to 750 mm. When the very low-power objective lens is used, the variable-power range is 0.5 to 3.75. When the low-power objective lens 11(1) is used, the variable-power range is 1 to 7.5. When the high-power objective lens 11(2) is used, the variable-power range is 4 to 30. The overall variable-power range is 0.5 to 30.

Figure 17:
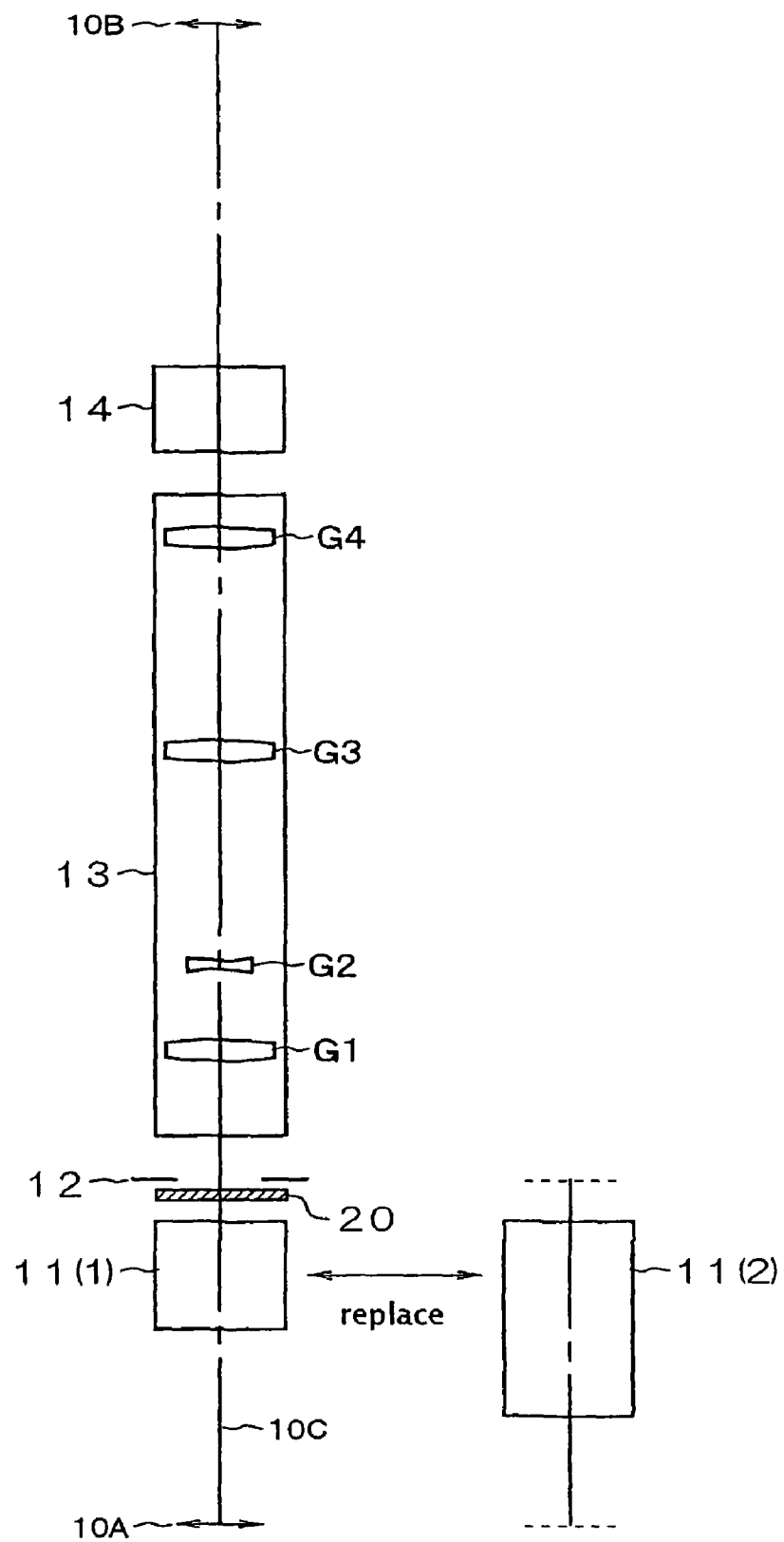
FIG. 17 is a view to illustrate the replacement of an objective lens 11.

Thus, in the zoom microscope 10 of the fifth embodiment, the replaceable objective lenses 11 (see the objective lenses 11(1), 11(2) in FIG. 17) share the afocal zoom system 13 and the variable-power range is shifted by the replacement of the objective lens 11, so that it is possible to expand the variable-power range with a simple structure (i.e., only one afocal zoom system 13).

The use of the very low-power objective lens (for example, 0.5× objective lens) as one of the replaceable objective lenses 11 makes it possible to expand the variable-power range up to a very low variable-power range (about 0.5 to about 2) with a simple structure. In this case, the zoom microscope 10 functions as a "macrozoom microscope", so that macro observation of the specimen 10A is also made possible. In the macro observation, a relatively large specimen 10A such as, for example, a metal specimen and a mechanical part (such as a gear) is observed. In order to respond to thickness change of the specimen 10A, the whole observation optical system from the objective lens 11 to the imaging optical system 14 is vertically moved.

When the very low-power objective lens (for example, the 0.5× objective lens) is used and the variable-power lens groups (G2, G3) of the afocal zoom system 13 are moved while the optical member 20 for phase contrast observation is inserted in the observation optical path 10C of the zoom microscope 10, it is possible to carry out the observation of the contrast image of the specimen 10A while zooming it at an arbitrary magnification in the low variable-power range (in the power range from about 0.5 to about 2). Further, the replacement of the objective lens enables the observation of the contrast image of the specimen 10A while zooming it at an arbitrary magnification in a wide variable-power range (for example, a power range from 0.5 to 30) including the aforesaid low variable-power range.

Further, in the zoom microscope 10 of the fifth embodiment, even replacing the objective lenses 11 does not necessitate replacing the optical member 20 for phase contrast observation. The optical member 20 is a member common to the plural objective lenses 11, and the kind of the objective lens 11 is changeable while the position of the optical member 20 is kept fixed. Therefore, only replacing the objective lens 11 by the rotation of the turret can change the observation magnification of the contrast image of the specimen 10A to a magnification in, for example, the aforesaid range (the power range from 0.5 to 30). Sharing the optical member 20 makes it possible to configure the zoom microscope 10 at low cost.

Further, in the zoom microscope 10 of the fifth embodiment, as has been described, even when the objective lens 11 is replaced, telecentricity on the object side can be ensured irrespective of the variable-power state of the afocal zoom system 13 (i.e., the positions of the variable-power lens groups G2, G3)). Therefore, even when the objective lens for use is changed to the low-power objective lens and the macro observation of the specimen 10A is carried out while the variable-power lens groups (G2, G3) are moved, telecentricity on the object side can be similarly ensured. Inserting the optical member 20 makes it possible to constantly obtain a good contrast image free of unevenness in field of view.

Figure 18:
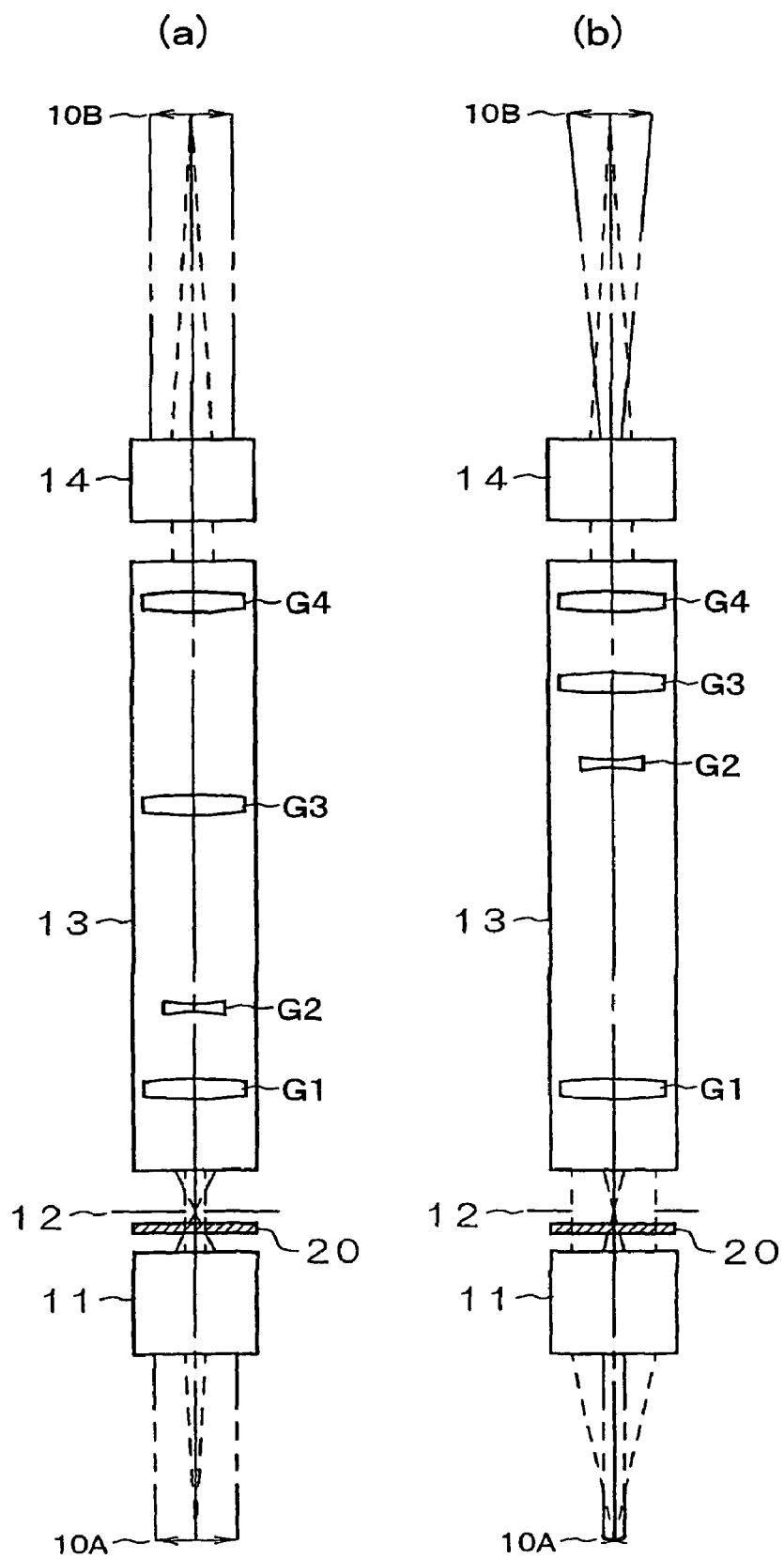
FIG. 18(a) and FIG. 18(b) are views to illustrate a change in stop diameter of an aperture stop 12, comparing a high-power state (a) and a low-power state (b) of an afocal zoom system 13.

Further, in the microscope 10 of the fifth embodiment, preferably, a variable aperture stop is used as the aperture stop 12, thereby making a stop diameter thereof variable according to the movement of the variable-power lens groups (G2, G3) of the afocal zoom system 13 (see FIG. 18(a) and FIG. 18(b)). In FIG. 18(a) and FIG. 18(b), out of the ray bundles emitted from the respective points of the specimen 10A, a center ray bundle is shown by the broken lines and peripheral principal rays closest to the image are shown by the two-dot chain lines. Note that not-shown principal rays as well as the shown principal rays are also parallel to the optical axis direction, and it is seen that telecentricity on the object side of the objective lens 11 is ensured.

FIG. 18(a) shows a state in which the lens groups (G2, G3) are moved to a low-power side, and reducing the stop diameter of the aperture stop 12 in conjunction with this movement makes it possible to regulate the opening angle of the center ray bundle to a small value. In this case, deep depth of focus observation (high field of view) with low NA becomes possible. FIG. 18(b) shows a state in which the lens groups (G2, G3) are moved to the high-power side, and increasing the stop diameter of the aperture stop 12 in conjunction with this movement makes it possible to widen the opening angle of the center ray bundle. In this case, high-resolution observation with high NA (small field of view) is possible. Adjusting the stop diameter of the aperture stop 12 makes it possible to constantly keep the contrast of the contrast image of the specimen 10A property when the optical member 20 is inserted, so that a good contrast image is obtainable.

Further, in the zoom microscope 10 of the fifth embodiment, telecentricity on the object side of the objective lens 11 can be ensured in the whole wide variable-power range (for example, a power range from 0.5 to 30), which enables coaxial epi-illumination free of vignetting.

Further, in the zoom microscope 10 of the fifth embodiment, inserting a coaxial epi-illuminator, a fluorescence epi-illuminator, a phototube, or the like in front of or at the back of the afocal zoom system 13 (that is, between the objective lens 11 and the afocal zoom system 13, or between the afocal zoom system 13 and the imaging optical system 14) can realize a diversity of observation methods in a wide variable-power range (also in the low variable-power range).

Especially because the objective lens 11 is replaceable, an interval between the objective lens 11 and the afocal zoom system 13 is changeable. Therefore, in addition to the optical member 20 for phase contrast observation, it is possible to dispose, for example, a fluorescence epi-illuminator or an optical system such as an AF system between the objective lens 11 and the afocal zoom system 13, when necessary. In short, the structure where the objective lens 11 is replaceable realizes the zoom microscope 10 with high scalability.

Figure 19:
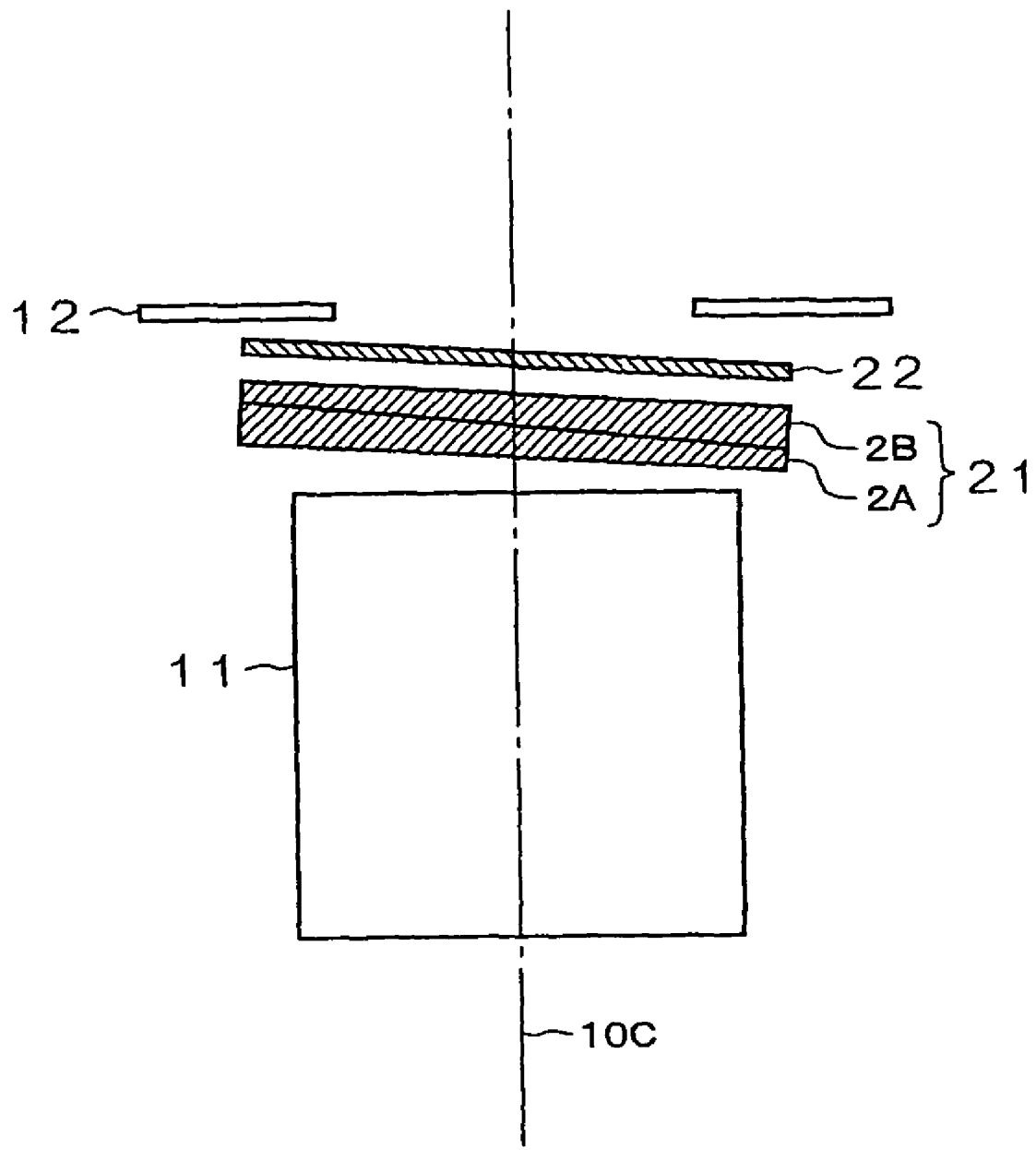
FIG. 19 is a view to illustrate a DIC prism 21 and an analyzer 22 for differential interference contrast observation of a specimen 10A.

Here, if differential interference contrast observation is assumed as an example of the phase contrast observation of the specimen 10A, a birefringence optical member 21 for differential interference contrast observation (hereinafter, referred to as a "DIC prism 21") shown in FIG. 19 is used as the optical member 20. The DIC prism 21 is a parallel flat plate formed of two wedge-shaped prisms 2A, 2B joined together, and is for example, a Wollaston prism, a Nomarski prism, or the like. FIG. 19 is an enlarged view showing an area between the objective lens 11 and the aperture stop 12 shown in FIG. 16. Moving the DIC prism 21 in a direction perpendicular to the observation optical path 10C can change a background contrast of a differential interference contrast image of the specimen 10A.

In the case of the DIC prism 21, preferably, an error amount $\Delta Z$ (mm) of the distance from the abutting joint surface of the replaceable objective lens 11 to the rear focal plane satisfies the following conditional expression (5). The error amount $\Delta Z$ departing from the range of the conditional expression (5) causes problems such as worsening a nonuniform field of view asymmetrically and lowering the contrast of the differential interference contrast image of the specimen 10A. Moreover, within the range of the conditional expression (5), the following conditional expression (6) is more preferably satisfied.

$$\Delta Z \leq 3.5 \text{ mm} \tag{5}$$

$$\Delta Z < 1 \text{ mm} \tag{6}$$

Further, for the differential interference contrast observation of the specimen 10A, an analyzer 22 is removably inserted between the DIC prism 21 and the aperture stop 12. These DIC prism 21 and analyzer 22, which exhibit effects when making a pair, are both inserted in the observation optical path 10C at the time of the differential interference contrast observation of the specimen 10A. Then, at the time of the bright-field observation, both are removed from the observation optical path 10C.

Setting the DIC prism 21 and the analyzer 22 perpendicular to the observation optical path 10C at the time of the differential interference contrast observation of the specimen 10 causes reflection light on surfaces thereof to directly enter the image plane 10B, which will be a cause of flare. Therefore, preferably, the DIC prism 21 and the analyzer 22 are set inclined relative to the observation optical path 10C. Further, an inclination angle thereof is preferably larger than an angle of the principal ray relative to an image point with the maximum field number.

Moreover, for the differential interference contrast observation of a transparent specimen 10A, a transilluminator is disposed under the specimen 10A (opposite the objective lens 11). It is necessary to dispose in the transilluminator a DIC prism similar to the aforesaid DIC prism 21 and a polarizer that is in cross-Nicol position with respect to the aforesaid analyzer 22.

In this transilluminator, linear polarized light from the polarizer is divided via the DIC prism into two ray bundles, which thereafter enter the specimen 10A. Then, the two ray bundles emitted from the specimen 10A interfere with each other via the DIC prism 21 and the analyzer 22 of the zoom microscope 10 to turn to a differential interference contrast image on the image plane 10B.

Incidentally, in the case of the differential interference contrast observation, the analyzer 22 is not limited to be positioned between the DIC prism 21 and the aperture stop 12, but may be positioned between the aperture stop 12 and the afocal zoom system 13 (FIG. 16), or may positioned between the afocal zoom system 13 and the imaging optical system 14. However, it is necessary to keep the cross-Nicol position of the analyzer 22 with respect to the polarizer of the transilluminator.

Further, a possible structure as a modification example of the differential interference contrast observation of the specimen 10A may be such that a slit is disposed instead of the DIC prism and the polarizer of the transilluminator, and the specimen 10A is illuminated by nonpolarized light from the slit (Japanese Unexamined Patent Application Publication No. 2003-322798). In this case, a polarizer is disposed on the objective lens 11 side of the DIC prism 21 of the zoom microscope 10.

Further, when phase difference observation is assumed as another example of the phase contrast observation of the specimen 10A, a phase plate (for example, a phase ring or a phase dot) is used as the optical member 20. The phase plate is preferably disposed near the aperture stop 12. Further, the use of a diffraction grating as the optical member 20 makes it possible to obtain a pseudo differential interference contrast image (Japanese Unexamined Patent Application Publication No. Hei 11-95174, Japanese Unexamined Patent Application Publication No. Hei 7-281099, and so on). Further, an ND plate for HMC (Hoffman Modulation Contrast) may be used as the optical member 20 (Japanese Unexamined Patent Application Publication No. Sho 51-29148, the specification of U.S. Pat. No. 4,200,354).

Sixth Embodiment

Figure 20:
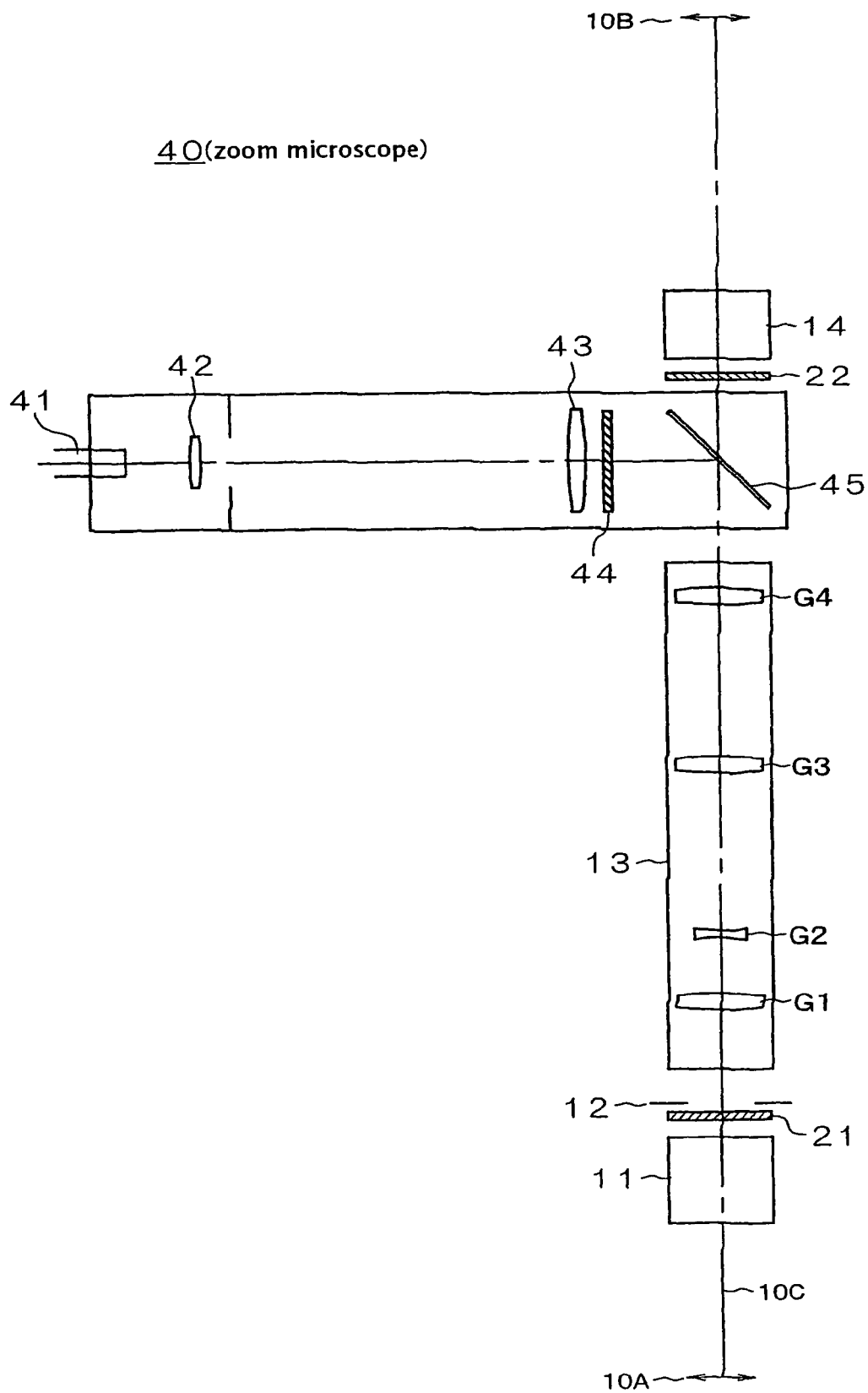
FIG. 20 is a view showing a whole configuration of a zoom microscope 40 of a sixth embodiment.

A zoom microscope 40 of a sixth embodiment is configured such that a coaxial epi-illuminator (41 to 45) is disposed between the afocal zoom system 13 and the imaging optical system 14 of the zoom microscope 10 of the fifth embodiment (FIG. 16), as shown in FIG. 20. This zoom microscope 40 is used for differential interference contrast observation of a transparent specimen 10A in industrial application.

In the zoom microscope 40 of the sixth embodiment, a DIC prism 21 similar to that in FIG. 19 is used as an optical member for phase contrast observation and this DIC prism 21 is disposed between the objective lens 11 and the aperture stop 12, and an analyzer 22 is disposed between the coaxial epi-illuminator (41 to 45) and the imaging optical system 14. Further, a polarizer 44 in cross-Nicol position with respect to the analyzer 22 is disposed in the coaxial epi-illuminator (41 to 45).

In the coaxial epi-illuminator (41 to 45), an outgoing ray bundle from a fiber light source 41 is guided to the afocal zoom system 13 via a collector lens 42, a relay lens 43, the polarizer 44, and a beam splitter 45 to reach the aperture stop 12 via the afocal zoom system 13. At this time, an image of a light source (an end face image of the fiber light source 41) is formed on the aperture stop 12 (or in its vicinity) by the coaxial epi-illuminator (41 to 45).

Thereafter, the ray bundle that has passed through the aperture stop 12 enters the specimen 10A via the DIC prism 21 and the objective lens 11. Thus, in the zoom microscope 40, linear polarized light from the polarizer 44 is divided via the DIC prism 21 into two ray bundles, which thereafter enter the specimen 10A. Then, the two ray bundles emitted from the specimen 10A interfere with each other via the DIC prism 21 and the analyzer 22 to turn to a differential interference contrast image on the image plane 10B.

As described above, since the rear focal plane of the objective lens 11 is located near the aperture stop 12 and telecentricity on the object side of the objective lens 11 can be ensured in the whole wide variable-power range (for example, a power range from 0.5 to 30), a principal ray of the ray bundle directed toward the specimen 10A from the objective lens 11 becomes parallel to the optical axis direction. In short, the illumination for the specimen 10A becomes coaxial epi-illumination (so-called telecentric illumination) free of vignetting.

This enables good differential interference contrast observation of the transparent specimen 10A. Especially in micro observation in a low-power range (in a power range from about 0.5 to about 2), poor telecentricity on the object side is not desirable since it results in a large angle at which principal rays (rays passing through the center of the pupil) in a screen peripheral portion pass through a pupil plane, thereby causing vignetting of the illumination in a field of view. In the zoom microscope 40 of this embodiment, telecentricity on the object side can be ensured also in the low-power range, which enables good macro observation of the differential interference contrast image by the coaxial epi-illumination free of vignetting.

Further, in the zoom microscope 40 of this embodiment, the coaxial epi-illuminator (41 to 45) is disposed between the afocal zoom system 13 and the imaging optical system 14 to illuminate the specimen 10A via the afocal zoom system 13 (that is, the afocal zoom system 13 is shared by the illumination system and the observation system), and therefore, it is possible to change an illumination range as well in conjunction with a change in an observation range of the specimen 10A at the time of power variation. This enables efficient coaxial epi-illumination and differential interference contrast observation of the specimen 10A.

Incidentally, when a diffraction grating is used instead of the DIC prism 21 as the optical member for phase contrast observation (Japanese Unexamined Patent Application Publication No. Hei 11-95174, Japanese Unexamined Patent Application Publication No. Hei 7-281099, and so on), good differential interference contrast observation similar to the above is also possible. In this case, the polarizer 44 and the analyzer 22 are not provided.

In the above-described sixth embodiment, the coaxial epi-illuminator (41 to 45) is provided between the afocal zoom system 13 and the imaging optical system 14, but the present invention is not limited thereto. The coaxial epi-illuminator (41 to 45) may be provided between the objective lens 11 and the afocal zoom system 13. In this case, it is possible to reduce flare and contrast deterioration ascribable to self-fluorescence on each lens plane in the observation optical system (from the objective lens 11 to the imaging optical system 14).

Seventh Embodiment

Figure 21:
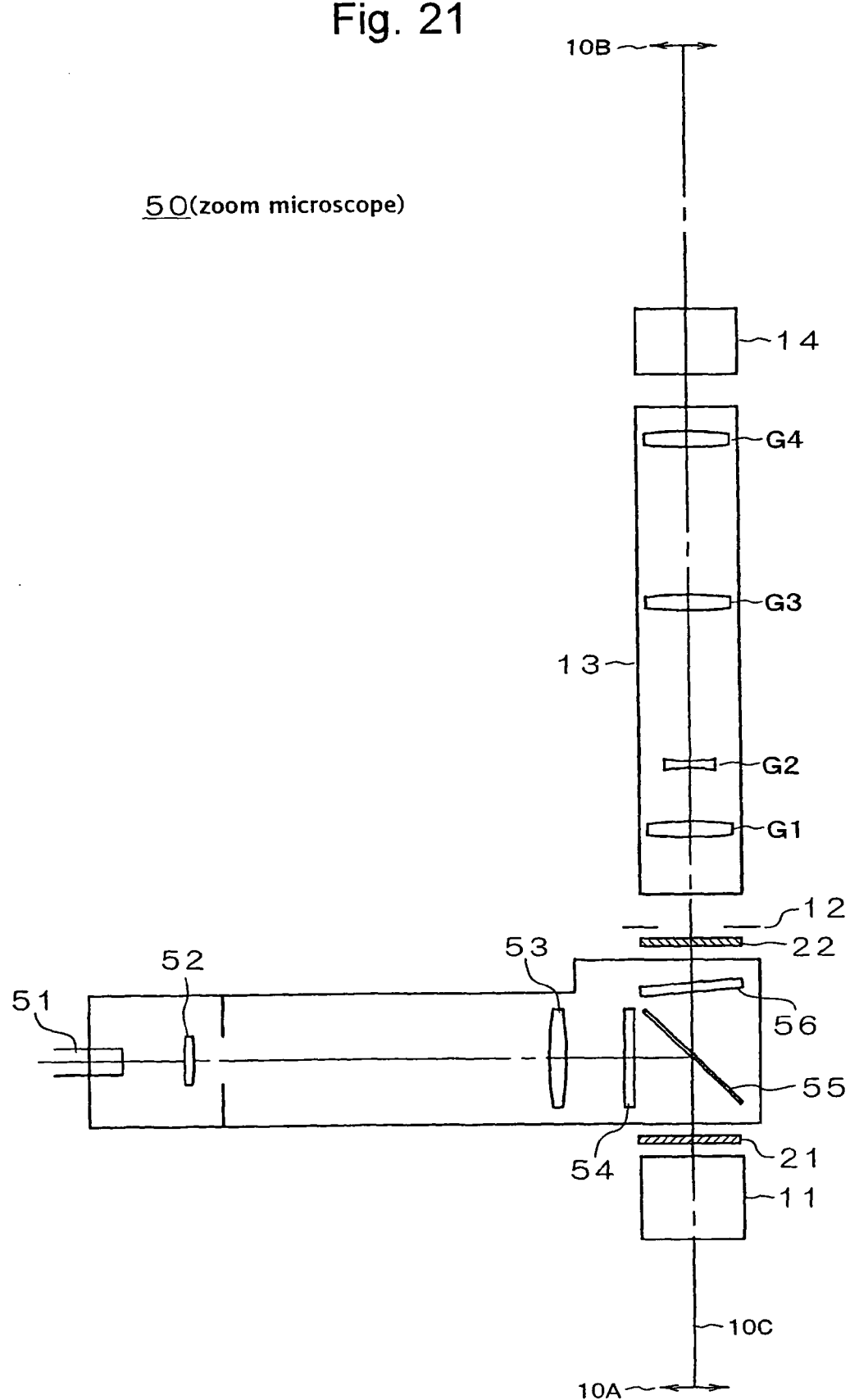
FIG. 21 is a view showing a whole configuration of a zoom microscope 50 of a seventh embodiment.

A zoom microscope 50 of a seventh embodiment is configured such that a fluorescence epi-illuminator (51 to 56) is provided between the objective lens 11 and the aperture stop 12 of the zoom microscope 10 of the fifth embodiment (FIG. 16) as shown in FIG. 21. Under a specimen 10A, a not-shown transilluminator is further disposed. The zoom microscope 50 is used for fluorescence observation and differential interference contrast observation based on feeble light from the transparent specimen 10A such as a biospecimen marked by a fluorescent substance.

In the zoom microscope 50 of the seventh embodiment, a DIC prism 21 similar to that in FIG. 19 is used as an optical member for phase contrast observation and this DIC prism 21 is disposed between the objective lens 11 and the fluorescence epi-illuminator (51 to 56), and an analyzer 22 is disposed between the fluorescence epi-illuminator (51 to 56) and the aperture stop 12. Further, in the not-shown transilluminator, a DIC prism similar to the DIC prism 21 is disposed and a polarizer in cross-Nicol position with respect to the analyzer 22 is disposed.

Similar to the above, in the transilluminator, linear polarized light from the polarizer is divided via the DIC prism into two ray bundles, which thereafter enter the specimen 10A. Then, the two ray bundles emitted from the specimen 10A interfere with each other via the DIC prism 21 and the analyzer 22 of the zoom microscope 50 to turn to a differential interference contrast image on the image plane 10B.

Meanwhile, in the fluorescence epi-illuminator (51 to 56), an outgoing ray bundle from a fiber light source 51 enters an excitation filter 54 via a collector lens 52, a relay lens 53, and a not-shown aperture stop. The excitation filter 54 transmits only a ray bundle (excitation light) in a wavelength band necessary for exciting the specimen 10A. The excitation light from the excitation filter 54 is led to the objective lens 11 via a dichroic mirror 55 to enter the specimen 10A via the objective lens 11.

Fluorescence emitted from the specimen 10A enters the aperture stop 12 via the objective lens 11, the dichroic mirror 55, and a barrier filter 56 and thereafter reaches an image plane 10B via the aperture stop 12, the afocal zoom system 13, and the imaging optical system 14. The fluorescence from the specimen 10A is feeble and enters the dichroic mirror 55 together with unnecessary excitation light reflected on the specimen 10A, but the unnecessary excitation light is cut off when it passes through the dichroic mirror 55 and the barrier filter 56, so that only the feeble fluorescence can be led to the image plane 10B.

Therefore, in the zoom microscope 50 of this embodiment, the two images overlapping each other, namely, the differential interference contrast image of the specimen 10A by the transillumination and a fluorescence image of the specimen 10A by the epi-illumination, can be formed on the image plane 10b. Consequently, the parallel execution of the fluorescence observation and the differential interference contrast observation of the specimen 10A becomes possible in the whole wide variable-power range (for example, a power range from 0.5 to 30).

Further, in this embodiment, an interval between the objective lens 11 and the afocal zoom system 13 is freely changeable. Therefore, the fluorescence observation and the phase contrast observation can proceed in parallel, with magnification being arbitrarily set in a wide magnification range.

Further, in the zoom microscope 50 of this embodiment, the excitation light from the fluorescence epi-illuminator (51 to 56) passes only through the objective lens 11 in the observation optical system (from the objective lens 11 to the imaging optical system 14) and passes through neither of the afocal zoom system 13 and the imaging optical system 14. This can minimize self-fluorescence that is generated by the excitation light in each lens element of the observation optical system. As a result, fluorescence observation with good contrast is enabled while reducing noise components ascribable to the self-fluorescence.

In the above-described seventh embodiment, the fluorescence epi-illuminator (51 to 56) is provided between the objective lens 11 and the aperture stop 12, but the present invention is not limited thereto. The fluorescence epi-illuminator (51 to 56) may be disposed between the aperture stop 12 and the afocal zoom system 13. In short, the fluorescence epi-illuminator (51 to 56) can be disposed at an arbitrary position between the objective lens 11 and the afocal zoom system 13.

Disposing the fluorescence epi-illuminator (51 to 56) between the objective lens 11 and the afocal zoom system 13 can reduce the number of lenses through which the epi-illumination (excitation light) passes, compared with that when the fluorescence epi-illuminator (51 to 56) is disposed between the afocal zoom system 13 and the imaging optical system 14. Therefore, transmittance of the epi-illumination becomes higher, which makes it possible to obtain a bright fluorescence image. Further, the self-fluorescence in each lens element becomes smaller and thus S/N of the fluorescence image is improved. Moreover, an optical material (glass material) of each lens element can be selected from a wider variety of materials.

In the zoom microscope 50 of this embodiment, the distance from the objective lens 11 to the aperture stop 12 becomes long and the fluorescence illumination is not telecentric illumination, but the telecentricity of the illumination is not a significant issue in the fluorescence observation since the fluorescence observation observes the fluorescence from a fluorescent substance in the specimen 10A irradiated with the excitation light.

Modification Example

The above fifth embodiment to seventh embodiment have described the examples where the stop diameter of the aperture stop 12 is variable according to the movement of the variable-power lens groups (G2, G3), but the present invention is not limited thereto. The present invention is also applicable to a case where the variable-power lens groups (G2, G3) are moved while the stop diameter is kept fixed.

Further, the above fifth embodiment to seventh embodiment have described the examples where the distances from the abutting joint surfaces of the respective objective lenses 11 to the rear focal plane are equal, but the present invention is not limited thereto. The present invention is also applicable to a case where the distance from the abutting joint surface to the rear focal plane is different depending on each objective lens 11. In this case, telecentricity on the object side can be maintained by moving the aperture stop 12 in the optical axis direction when the objective lens 11 is replaced.

Further, in the above fifth embodiment to seventh embodiment, the magnification of the objective lens 11 is in the power range from 0.5 to 4 (in terms of focal length fobj, a range of fobj=25 mm to 200 mm) and the magnification of the afocal zoom system is in a power range from 1 to 7.5 (in terms of focal length fz, in a range of fz=100 mm to 750 mm), but the present invention is not limited thereto. The present invention is also applicable to a case where the focal length of the objective lens 11 is set as fobj=5 mm to 400 mm and the focal length fz is set as fz=50 mm to 1000 mm, thereby setting the overall variable-power range of the image of the specimen 10A to 0.125 to 200.

Eighth Embodiment

In low-magnification observation, a real field of view becomes large. Specifically, object height becomes large and accordingly a difference in height between a ray bundle on an optical axis passing through a lens and peripheral ray bundles becomes large, so that pupil aberration and chromatic aberration in addition to normal aberration involved in imaging are far more difficult to correct. As has been previously described, in the epi-illumination observation and the like, an object side requires substantially telecentric illumination in order to obtain uniform brightness up to the periphery of a field of view, to eliminate perspective, and to reduce a magnification change of an image due to a positional change of the object.

A basic configuration of an objective lens for solving this is characterized in that it includes a first lens group G1 having a positive refractive power as a whole, a second lens group G2 having a negative refractive power as a whole, and a third lens group G3 having a positive refractive power as a whole, which are arranged in this order from the object side, and the first lens group G1 includes a meniscus-shaped single lens having a positive refractive power and having a convex surface on the object side or a meniscus-shaped cemented lens having a positive refractive power and having a convex surface on the object side, and the second lens group G2 includes at least one cemented lens and is substantially telecentric on the object side.

Further, in macro observation, differential interference contrast observation is often required in order to increase the contrast, but in this case, in order to obtain an image free of uneven color, it is especially necessary to sufficiently correct axial chromatic aberration and spherical aberration of an image-side pupil of the objective lens, a change of the spherical aberration due to color, and the like. In order to obtain a flat image, it is also necessary to efficiently correct Petzval sum relating to curvature of field.

A preferable configuration of the objective lens to this end is characterized in that the second lens group G2 has two meniscus-shaped cemented lenses, and the two meniscus-shaped cemented lenses are disposed so that concave surfaces thereof face each other.

A configuration giving preferable conditions in view of chromatic aberration correction is characterized in that the meniscus-shaped cemented lens, in the first lens group G1, having the positive refractive power and having the convex surface on the object side, and the cemented lens, in the second lens group G2, closest to the object side are each formed of a positive lens and a negative lens bonded together, and satisfy the following conditional expressions.

$$1.1 < \nu dp1/\nu dn1 < 3.5 \tag{7}$$

$$1.1 < \nu dp2/\nu dp2 < 3.0 \tag{8}$$

Note that νdp1 is Abbe number of a glass material of the positive lens forming the meniscus-shaped cemented lens in the first lens group G1. νdn1 is Abbe number of a glass material of the negative lens forming the meniscus-shaped cemented lens in the first lens group G1. νdn2 is Abbe number of a glass material of the negative lens forming the cemented lens closest to the object side among the cemented lenses included in the second lens group G2. νdp2 is Abbe number of a glass material of the positive lens forming the cemented lens closest to the object side among the cemented lenses included in the second lens group G2.

The conditional expression (7) gives a ratio of the Abbe number νdp1 and the Abbe number νdn1 of the glass materials of the positive lens and the negative lens which form the meniscus-shaped cemented lens having the positive refractive power and having the convex surface on the object side, in the first lens group G1. In this cemented lens, the positive lens uses the glass material whose Abbe number is larger than that of the glass material of the negative lens, so that the cemented lens has an achromatizing effect. The conditional expression (8) defines a ratio of the Abbe number νdn2 and the Abbe number νdp2 of the glass materials of the negative lens and the positive lens which form the cemented lens closest to the object side in the second lens group G2. In contrast to the conditional expression (7), the negative lens uses the glass material whose Abbe number is larger than that of the positive lens, so that a cemented surface has a chromatizing effect.

Thus, satisfying both the conditional expression (7) and the conditional expression (8) can realize chromatic aberration correction of both the whole objective lens system and the exit pupil. The ratio over the upper limit value of the conditional expression (7) results in excessive achromatizing of the first lens group, which makes it difficult to correct chromatic aberration of magnification. On the other hand, the ratio below the lower limit value results in insufficient achromatizing of the first lens group, which increases axial chromatic aberration of the image-side pupil of the objective lens. Here, by defining the upper limit value and the lower limit value of the conditional expression (7) as 2.9 and 1.9 respectively, it becomes possible to correct the chromatic aberration of the whole objective lens system and the chromatic aberration of the exit pupil more efficiently.

Further, a configuration giving preferable conditions for enabling the connection to a zoom optical system is characterized in that it satisfies the following conditional expression (9).

$$0.8 < EP/OD < 1.5 \tag{9}$$

Note that EP is the distance on the optical axis from the object position to the position of the image-side pupil of the objective lens. OD is the distance on the optical axis from the object position to the farthest plane from the object in the objective lens.

Even the macro observation often requires some degree of magnified observation, and thus a zoom function is also often demanded. At this time, in order to connect the objective lens to the zoom optical system subsequent to the objective lens without causing any vignetting of the ray bundle, it is necessary to put the exit pupil of the objective lens toward the image side and preferably, to position it outside the lens. Even when such a configuration is adopted, it is necessary to well correct axial chromatic aberration of the pupil, spherical aberration of the pupil, and off-axis aberration such as astigmatism and coma aberration of the whole objective lens system. The conditional expression (9) is a preferable condition for adopting the aforesaid configuration. The ratio over the upper limit value of the conditional expression (9) results in an excessively large distance of the exit pupil away from the object plane, which makes it difficult to correct the off-axis aberrations such as astigmatism and coma aberration of the objective lens, and also makes the correction in the subsequent optical system impossible, and consequently, the configuration of the whole optical system becomes difficult. On the other hand, the ratio under the lower limit value of the conditional expression (9) results in an excessively short distance of the image-side pupil from the object plane, which makes it difficult to correct the axial chromatic aberration of the pupil and the spherical aberration of the pupil and in addition, makes the connection to the subsequent zoom optical system difficult. Setting the upper limit value and the lower limit value of the conditional expression (9) to 1.2 and 0.9 respectively makes it possible to correct the aforesaid aberrations more efficiently.

Further, a configuration giving a conditional expression that defines a preferable degree of reduction in deviation from complete telecentricity is characterized in that it satisfies the following conditional expression (10).

$$-0.3<\alpha<0.3 \tag{10}$$

Note that $\alpha$ is an angle (in a degree unit) of the principal ray relative to the optical axis at a given position on the object.

$\alpha$ falling outside this range of the conditional expression (10) causes uneven illumination at the time of the epi-illumination, so that an image with uniform brightness is not obtainable. $\alpha$ exceeding the upper limit value of the conditional expression (10) results in an excessively large lens diameter, which is problematic in view of a system configuration.

The following expressions are conditional expressions that are preferably further satisfied in view of the system configuration.

$$0.5<|R1/f2|<1.5 \tag{11}$$

$$0.5<|R2/f2|<1.8 \tag{12}$$

Note that R1 is a radius of curvature of the concave surface of the object-side cemented lens, out of the meniscus-shaped cemented lenses having the concave surfaces facing each other in the second lens group G2. R2 is a radius of curvature of the concave surface facing the concave surface with the aforesaid R1, in the image-side cemented lens out of the meniscus-shaped cemented lenses having the concave surfaces facing each other in the second lens group G2. f2 is focal length of the second lens group G2.

The conditional expression (11) and the conditional expression (12) relate to the correction of coma aberration and Petzval sum of the whole objective lens system. The ratios exceeding the upper limit values of the conditional expression (11) and the conditional expression (12) both result in excessively large radii of curvature of the concave surfaces facing each other, which makes the correction of the Petzval sum difficult, so that the curvature of field remains. On the other hand, the ratios under the lower limit values result in excessively small radii of curvature of the concave surfaces facing each other, which makes the correction of the coma aberration, astigmatism, and so on difficult.

The following expression is another conditional expression further preferably satisfied in view of a configuration of the objective lens.

$$0.5<|HR3/Y|<1.1 \tag{13}$$

Note that HR3 is the height of the principal ray corresponding to the maximum object height in the cemented surface of the meniscus-shaped cemented lens having the positive refractive power and having the convex surface on the object side, which is included in the first lens group G1. Y is the maximum object height.

The conditional expression (13) relates to the correction of the longitudinal chromatic aberration and the ensuring of telecentricity. The ratio over the upper limit value of the conditional expression (13) results in an excessively high position of the principal ray in this cemented surface compared with the object height, which makes it difficult to correct the chromatic aberration of magnification in the whole objective lens system and results in a large lens diameter, so that it becomes difficult to ensure telecentricity. The ratio below the lower limit value results in an excessively low position of the principal ray in this cemented surface compared with the object height, which makes it difficult to correct the longitudinal chromatic aberration of the pupil and spherical aberration of the pupil on the exit pupil.

Figure 22:
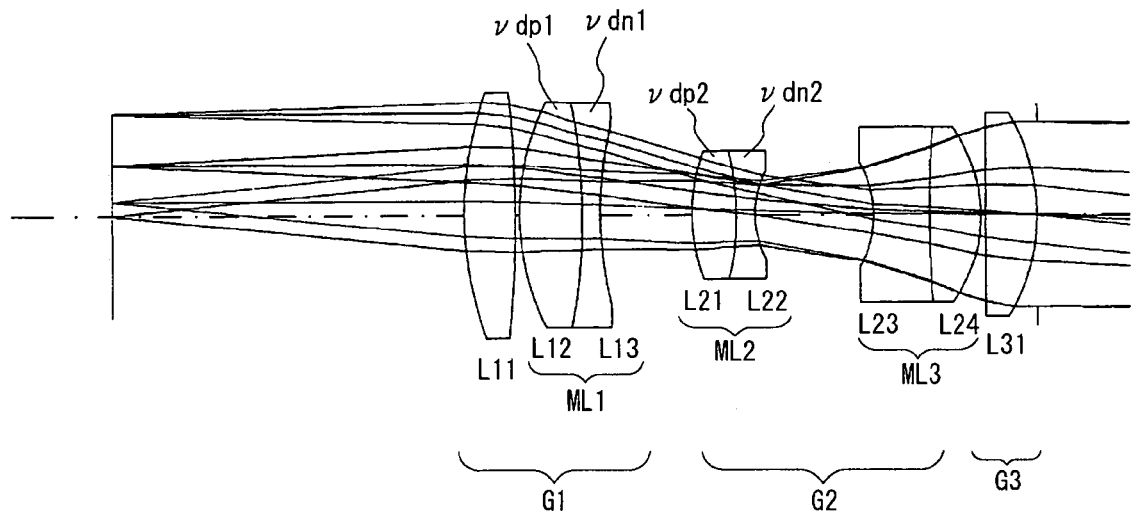
FIG. 22 is a configuration view (optical path view) of an objective lens of an eighth embodiment.

FIG. 22 is a view showing a configuration of the objective lens of the eighth embodiment according to the present invention. Note that FIG. 22 also shows optical paths of rays emitted from four points, on the object, in an area from the center up to the outermost periphery of the object. The objective lens of the eighth embodiment is composed of a first lens group G1, a second lens group G2, and a third lens group G3 which are arranged in this order from the object side. The first lens group G1 is composed of: a first lens component L11 being a biconvex lens whose surface on the object side has a larger refractive power; and a second lens component ML1 which is a cemented meniscus lens having a positive refractive power and having a convex surface on the object side and which is composed of a lens L12 and a lens L13. The second lens group G2 is composed of two meniscus-shaped cemented lenses, namely, a third lens component ML2 composed of a lens L21 and a lens L22, and a fourth lens component ML3 composed of a lens L23 and a lens L24. ML2 and ML3 are arranged so that concave surfaces thereof face each other. The third lens group G3 is composed of a fifth lens component L31 being a biconvex lens whose surface on the image side has a larger refractive power.

This embodiment is an infinity objective lens designed such that total magnification $\beta=-1$ and NA=0.03 when the minimum focal length of the subsequent zoom lens system is 100 mm, and a zoom ratio can be increased to a maximum of about 8× and NA can be increased to a maximum of 0.1.

The following Table 5 shows various original values of the eighth embodiment. In Table 5, $\beta$ is an adaptable magnification range, NA is numerical aperture on the object side, F is synthesized focal length of the whole objective lens system (in mm unit), and D0 is the distance (in mm unit) from the object to the first lens plane. The numerals on the left end represent the order from the object side, R represents a radius of curvature (in mm unit) of each lens plane, D represents lens thickness and each interval between lens planes (in mm unit), nd represents refractive power for the d-line (λ=587.562 nm), and νd represents the Abbe number of the glass material of each lens.

TABLE 5

β = −1~−7.5, NA = 0.03~0.1,
DO = 37.8, F = 99.7

| NO. | R | D | nd | νd |
|---|---|---|---|---|
| 1: | 39.25410 | 5.500000 | 1.59240 | 68.3 |
| 2: | −133.28791 | 0.500000 | | |
| 3: | 27.69737 | 6.718011 | 1.59240 | 68.3 |
| 4: | −64.55481 | 2.000000 | 1.72047 | 34.7 |
| 5: | 43.44754 | 9.949972 | | |
| 6: | 20.55359 | 4.717811 | 1.71736 | 29.5 |
| 7: | −28.90048 | 2.000000 | 1.83481 | 42.7 |
| 8: | 10.74737 | 12.641442 | | |
| 9: | −11.15870 | 5.955076 | 1.83481 | 42.7 |
| 10: | 121.28201 | 5.518289 | 1.49782 | 82.5 |
| 11: | −16.47334 | 0.500000 | | |
| 12: | 1825.60719 | 5.500000 | 1.59240 | 68.3 |
| 13: | −21.22923 | | | |

Figure 23:
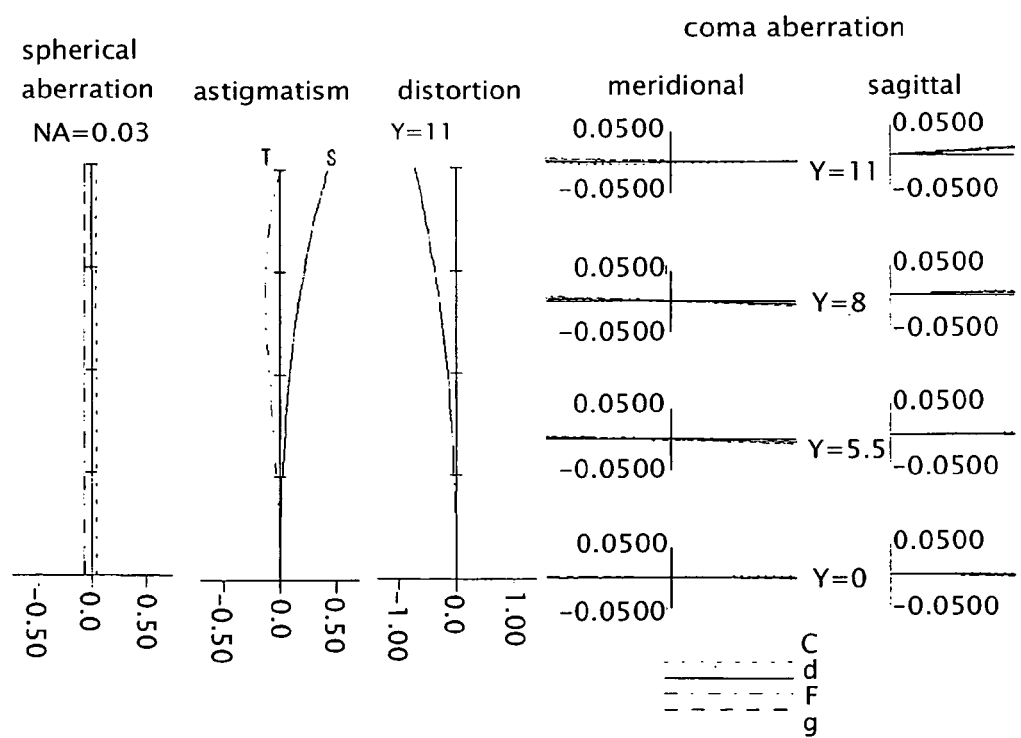
FIG. 23 is a view showing various aberrations in the objective lens of the eighth embodiment when focal length of a subsequent zoom optical system is 100 mm.
Figure 24:
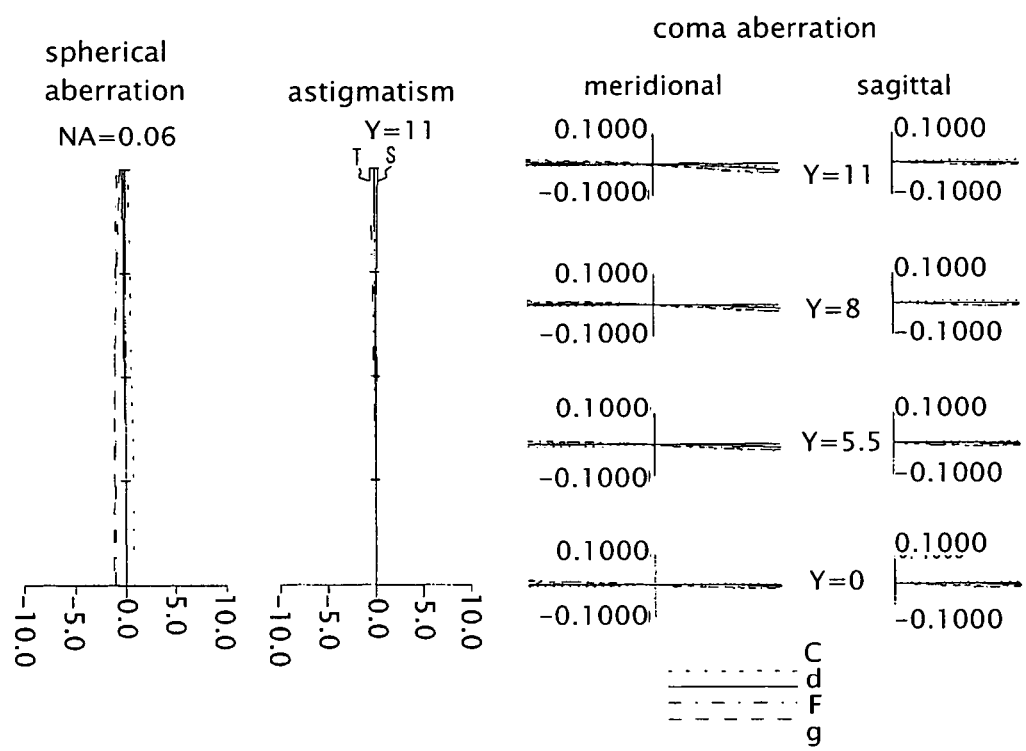
FIG. 24 is a view showing various aberrations in the objective lens of the eighth embodiment when the focal length of the subsequent zoom optical system is 400 mm.
Figure 25:
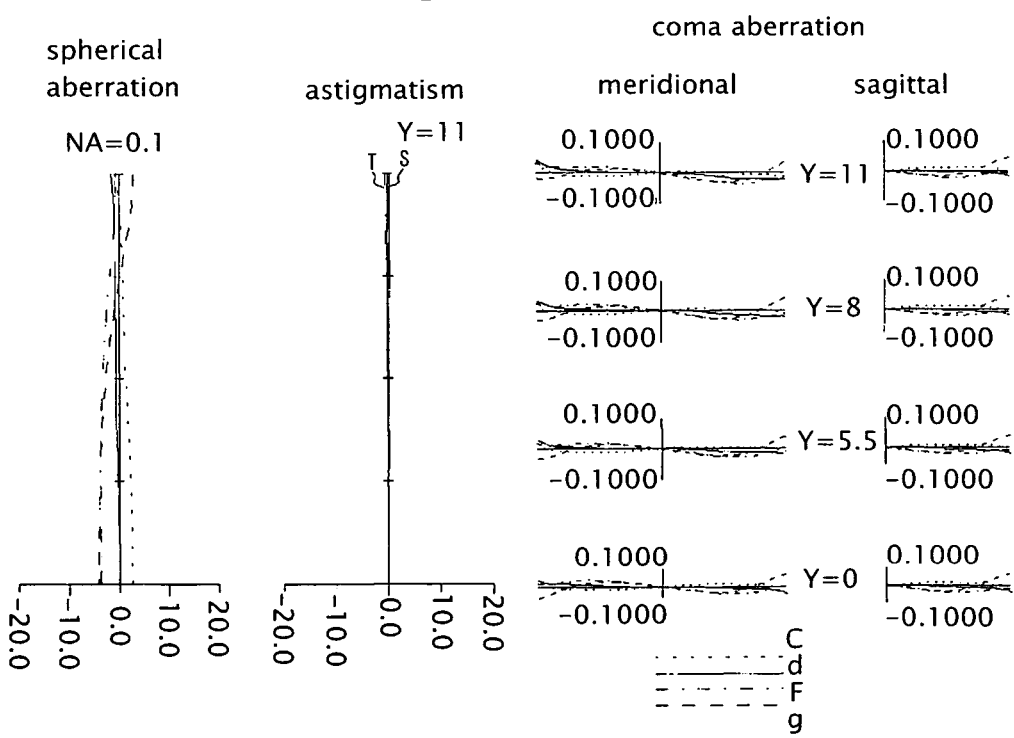
FIG. 25 is a view showing various aberrations in the objective lens of the eighth embodiment when the focal length of the subsequent zoom optical system is 750 mm.

FIG. 23 to FIG. 25 are views showing various aberrations in the eighth embodiment.

FIG. 23 is an aberration view showing spherical aberration, astigmatism, distortion aberration, and coma aberration which are calculated as an ideal lens when focal length of a zoom optical system (including an imaging lens) subsequent to the objective lens is 100 mm. As shown in FIG. 23, in the objective lens of the eighth embodiment, good correction is made in respective wavelengths of the d-line (587.562 nm), C-line (656.273 nm), F-line (486.133 nm), and g-line (435.835 nm), with NA=0.03 and field number=22.

FIG. 24 is an aberration view showing the aforesaid aberrations calculated as an ideal lens when the focal length of the zoom optical system (including the imaging lens) subsequent to the objective lens is 400 mm. As shown in FIG. 24, in the objective lens of the eighth embodiment, good correction is made in the respective wavelengths of the d-line, C-line, F-line, and g-line, with NA=0.06 and field number=2.

FIG. 25 is an aberration view showing the aforesaid aberrations calculated as an ideal lens when the focal length of the zoom optical system (including the imaging lens) subsequent to the objective lens is 750 mm. As shown in FIG. 25, in the objective lens of the eighth embodiment, good correction is made in the respective wavelengths of the d-line, C-line, F-line, and the g-line, with NA=0.1 and field number=22.

Ninth Embodiment

Figure 26:
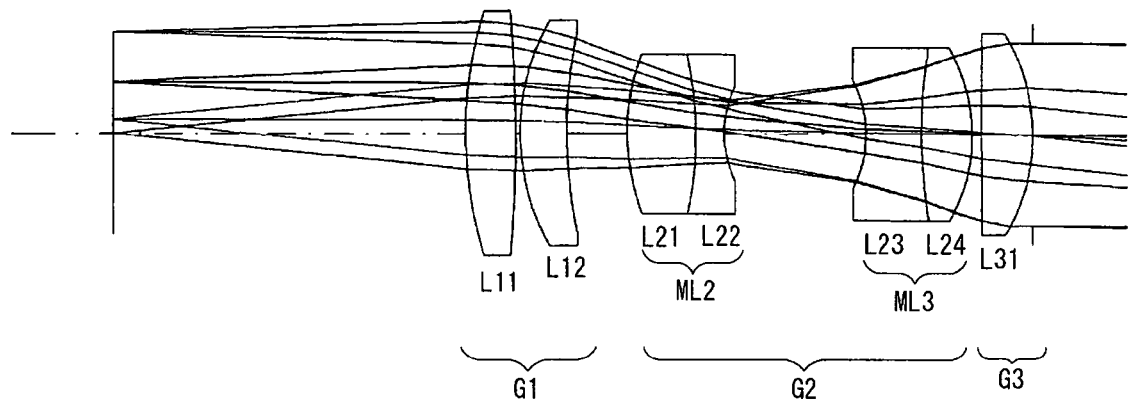
FIG. 26 is a configuration view (optical path view) of an objective lens of a ninth embodiment.

FIG. 26 is a configuration view (optical path view) of an objective lens of a ninth embodiment according to the present invention. The ninth embodiment has the same configuration as that of the above-described eighth embodiment except that L12 constituting a first lens group G1 is a meniscus-shaped single lens with a positive refractive power. The ninth embodiment is an infinity objective lens designed such that total magnification β=−1 and NA=0.03 when the minimum focal length of a subsequent zoom lens system is 100 mm, and a zoom ratio can be increased to a maximum of about 8× and NA can be increased to a maximum of 0.1.

The following Table 6 shows various original values of the ninth embodiment as in the above-described eighth embodiment.

TABLE 6

β = −1~−7.5, NA = 0.03~0.1,
DO = 38.0, F = 99.6

| NO. | R | D | nd | νd |
|---|---|---|---|---|
| 1: | 44.99800 | 5.500000 | 1.59240 | 68.3 |
| 2: | −154.71000 | 0.500000 | | |
| 3: | 25.23100 | 5.000000 | 1.59240 | 68.3 |
| 4: | 53.22200 | 6.500000 | | |
| 5: | 25.47300 | 7.500000 | 1.49782 | 82.5 |
| 6: | −40.27000 | 3.000000 | 1.75500 | 52.3 |
| 7: | 11.27600 | 15.250000 | | |
| 8: | −12.87300 | 6.000000 | 1.80400 | 46.6 |
| 9: | 59.78600 | 5.500000 | 1.49782 | 82.5 |
| 10: | −18.89500 | 1.000000 | | |
| 11: | 1128.31000 | 5.500000 | 1.59240 | 68.3 |
| 12: | −21.60030 | | | |

Figure 27:
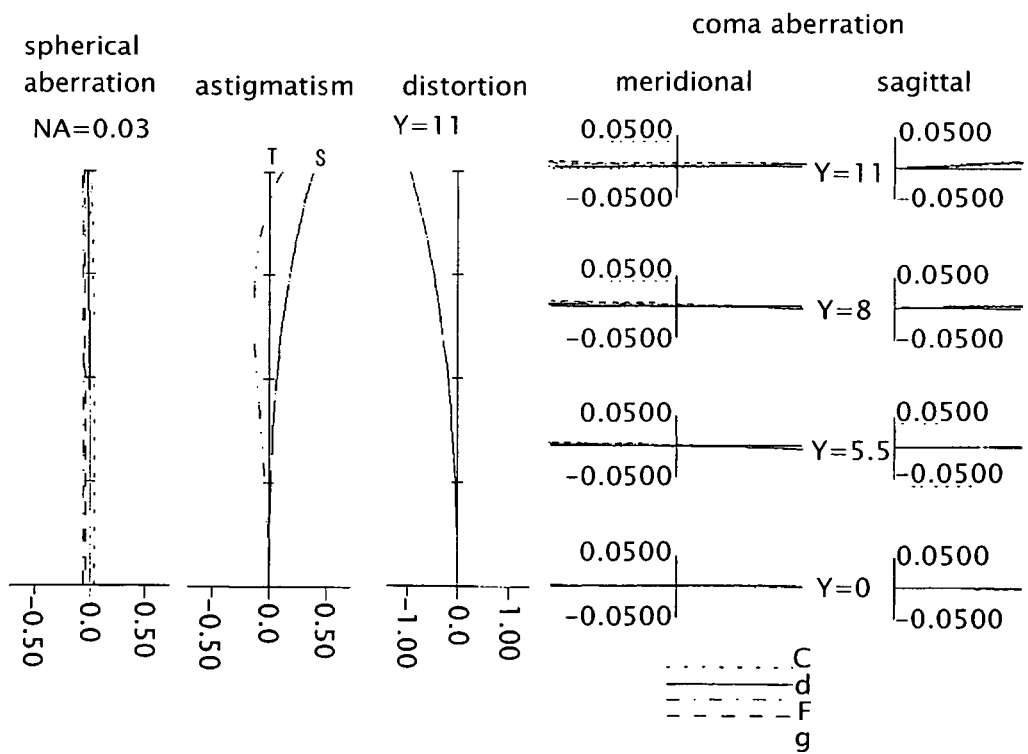
FIG. 27 is a view showing various aberrations in the objective lens of the ninth embodiment when focal length of a subsequent zoom optical system is 100 mm.
Figure 28:
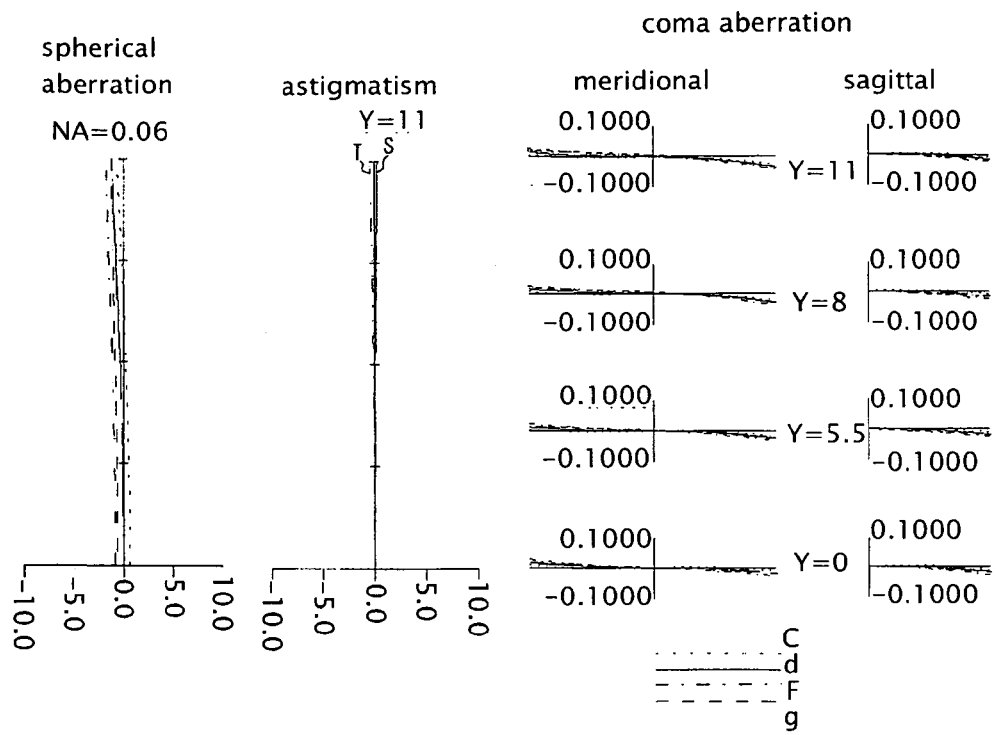
FIG. 28 is a view showing various aberrations in the objective lens of the ninth embodiment when the focal length of the subsequent zoom optical system is 400 mm.
Figure 29:
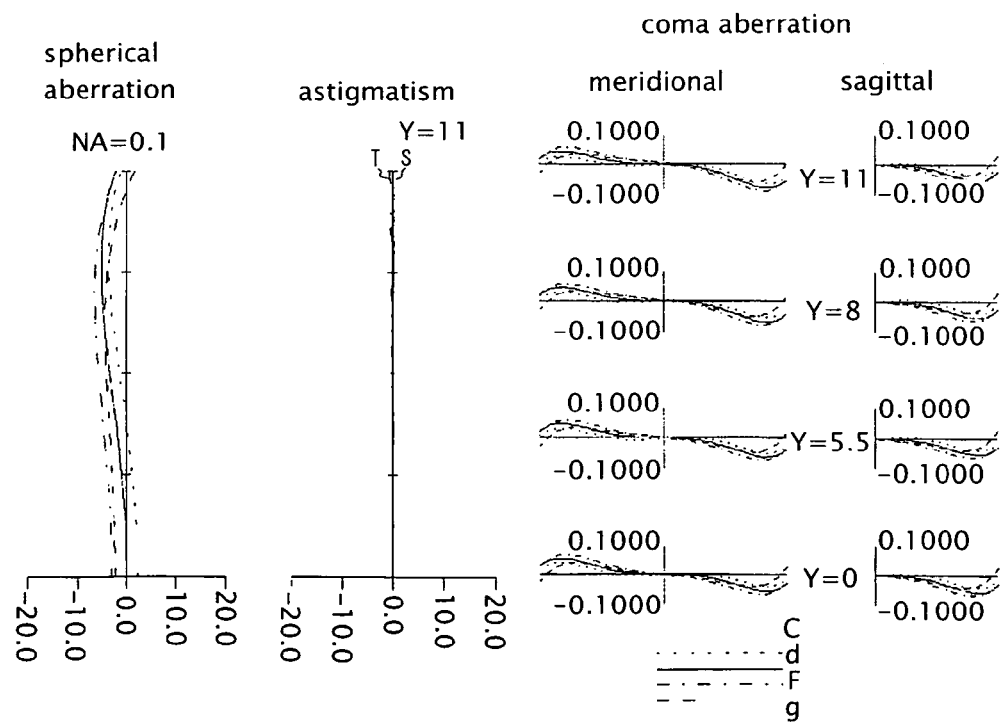
FIG. 29 is a view showing various aberrations in the objective lens of the ninth embodiment when the focal length of the subsequent zoom optical system is 750 mm.

FIG. 27 to FIG. 29 show various aberrations in the ninth embodiment.

FIG. 27 is a view showing various aberrations, as in the eighth embodiment, which are calculated as an ideal lens when focal length of a zoom optical system (including an imaging lens) subsequent to the objective lens is 100 mm. As shown in FIG. 27, in the objective lens of the ninth embodiment, good correction is made in respective wavelengths of the d-line, C-line, F-line, and g-line, with NA=0.03 and field number=22.

FIG. 28 is a view showing various aberrations calculated as an ideal lens when the focal length of the zoom optical system (including the imaging lens) subsequent to the objective lens is 400 mm.

As shown in FIG. 28, in the objective lens of the ninth embodiment, good correction is made in the respective wavelengths of the d-line, C-line, F-line, and g-line, with NA=0.06 and field number=22.

FIG. 29 is a view showing various aberrations calculated as an ideal lens when the focal length of the zoom optical system (including the imaging lens) subsequent to the objective lens is 750 mm.

As shown in FIG. 29, in the objective lens of the ninth embodiment, good correction is made in the respective wavelengths of the d-line, C-line, F-line, and g-line, with NA=0.1 and field number=22.

Tenth Embodiment

Figure 30:
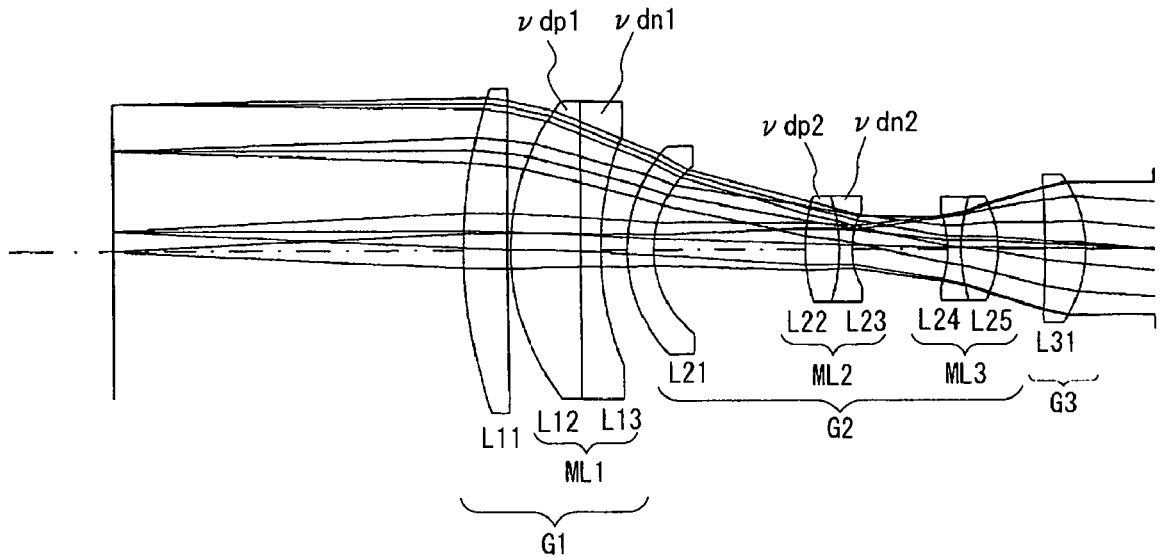
FIG. 30 is a configuration view (optical path view) of an objective lens of a tenth embodiment.

FIG. 30 is a configuration view (optical path view) of an objective lens of a tenth embodiment according to the present invention. The tenth embodiment is composed of a first lens group G1, a second lens group G2, and a third lens group G3 which are arranged in this order from an object side. The first lens group G1 is composed of: a first lens component L11 being a biconvex lens; and a second lens component ML1 which is a cemented meniscus lens having a positive refractive power and having a convex surface on the object side and which is composed of a lens L12 and a lens L13. The second lens group G2 is composed of: a third lens component L21 being a meniscus lens having a concave surface on an image side; and two meniscus-shaped cemented lenses, namely, a fourth lens component ML2 composed of a lens L22 and a lens L23 and a fifth lens component ML3 composed of a lens L24 and a lens L25. ML2 and ML3 are arranged so that concave surfaces thereof face each other. The third lens group G3 is composed of a sixth lens component L31 being a biconvex lens whose image-side surface has a larger refractive power. The tenth embodiment is an infinity objective lens designed such that total magnification β=−0.5 and NA=0.015 when the minimum focal length of a subsequent zoom lens system is 100 mm, and a zoom ratio can be increased to a maximum of about 8× and NA can be increased to a maximum of 0.05.

The following Table 7 shows various original values of the tenth embodiment as in the above-described eighth embodiment.

TABLE 7

β = −0.5~−3.75, NA = 0.015~0.05, DO = 52.0, F = 198.0

| NO. | R | D | nd | νd |
|---|---|---|---|---|
| 1: | 74.30554 | 6.500000 | 1.77250 | 49.6 |
| 2: | 2037.03211 | 0.500000 | | |
| 3: | 36.39599 | 10.400000 | 1.75500 | 52.3 |
| 4: | INFINITY | 3.000000 | 1.80809 | 22.8 |
| 5: | 45.76349 | 4.000000 | | |
| 6: | 22.64802 | 4.000000 | 1.64000 | 60.1 |
| 7: | 16.06360 | 22.600000 | | |
| 8: | 28.01779 | 5.000000 | 1.80809 | 22.8 |
| 9: | −28.01779 | 2.000000 | 1.80400 | 46.6 |
| 10: | 12.31254 | 13.950000 | | |
| 11: | −17.06184 | 2.000000 | 1.90265 | 35.7 |
| 12: | 27.41684 | 5.500000 | 1.49782 | 82.5 |
| 13: | −17.14338 | 7.000000 | | |
| 14: | −130.69481 | 6.000000 | 1.59240 | 68.3 |
| 15: | −19.30158 | | | |

Figure 31:
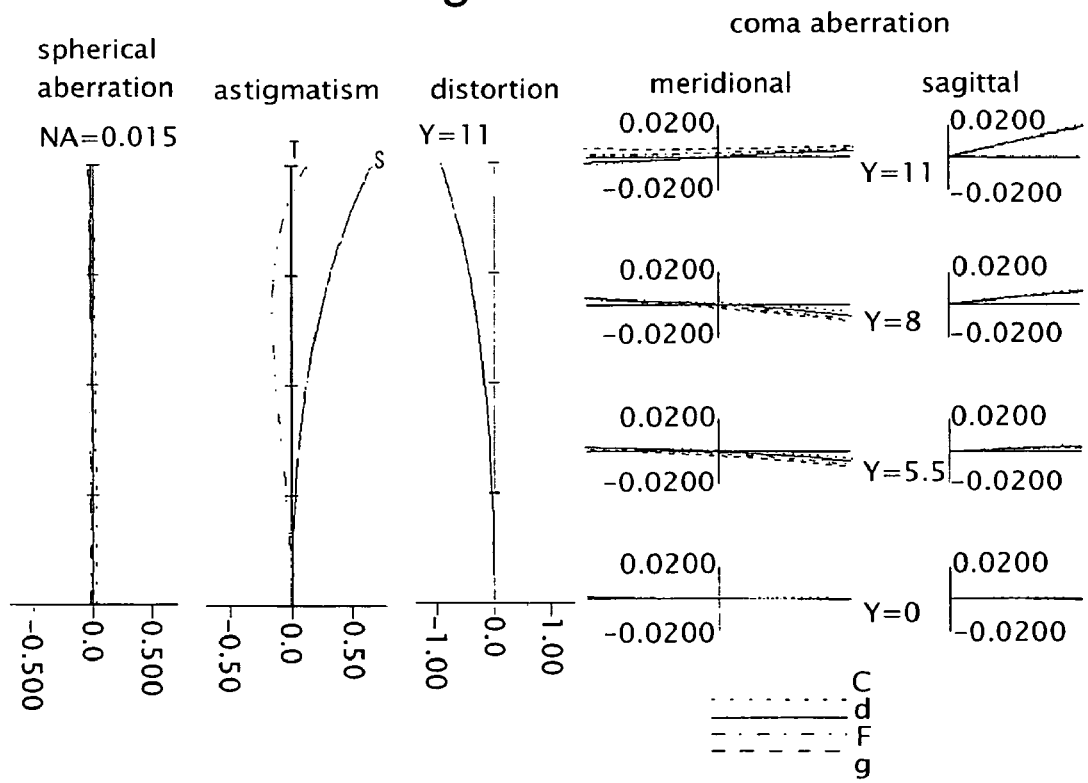
FIG. 31 is a view showing various aberrations in the objective lens of the tenth embodiment when focal length of a subsequent zoom optical system is 100 mm.
Figure 32:
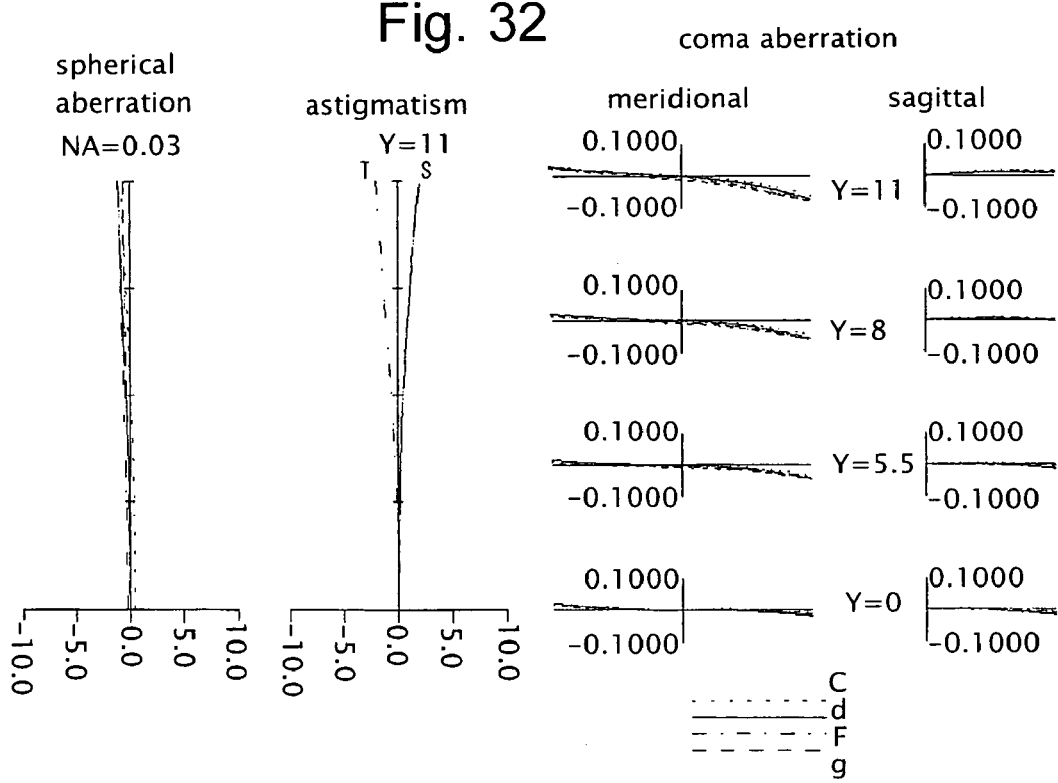
FIG. 32 is a view showing various aberrations in the objective lens of the tenth embodiment when the focal length of the subsequent zoom optical system is 400 mm.
Figure 33:
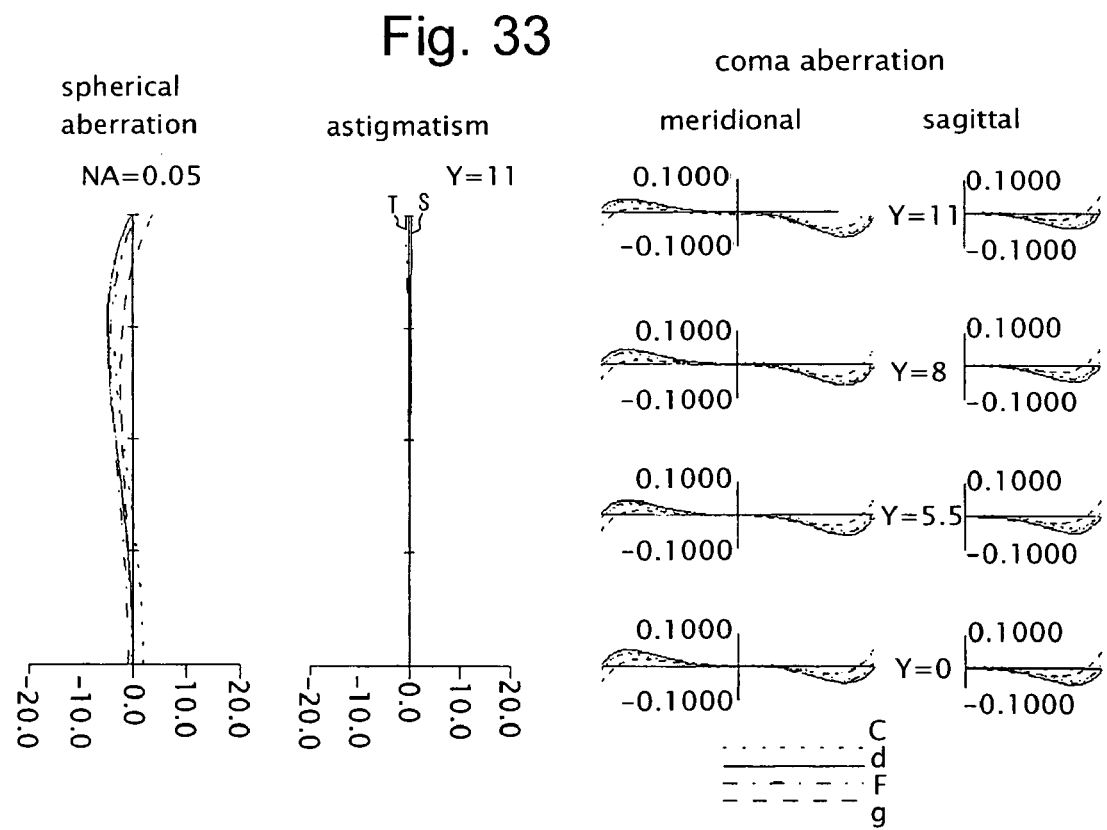
FIG. 33 is a view showing various aberrations in the objective lens of the tenth embodiment when the focal length of the subsequent zoom optical system is 750 mm.

FIG. 31 to FIG. 33 show various aberrations in the tenth embodiment.

FIG. 31 is a view showing various aberrations, as in the eighth embodiment, which are calculated as an ideal lens when focal length of a zoom optical system (including an imaging lens) subsequent to the objective lens is 100 mm. As shown in FIG. 31, in the objective lens of the tenth embodiment, good correction is made in respective wavelengths of the d-line, C-line, F-line, and g-line, with NA=0.015 and field number=22.

FIG. 32 is a view showing various aberrations calculated as an ideal lens when the focal length of the zoom optical system (including the imaging lens) subsequent to the objective lens is 400 mm. As shown in FIG. 32, in the objective lens of the tenth embodiment, good correction is made in the respective wavelengths of the d-line, C-line, F-line, and g-line, with NA=0.03 and the field number=22.

FIG. 33 is a view showing various aberrations calculated as an ideal lens when the focal length of the zoom optical system (including the imaging lens) subsequent to the objective lens is 750 mm. As shown in FIG. 33, in the objective lens of the tenth embodiment, good correction is made in the respective wavelengths of the d-line, C-line, F-line, and g-line, with NA=0.05 and field number=22.

Eleventh Embodiment

Figure 34:
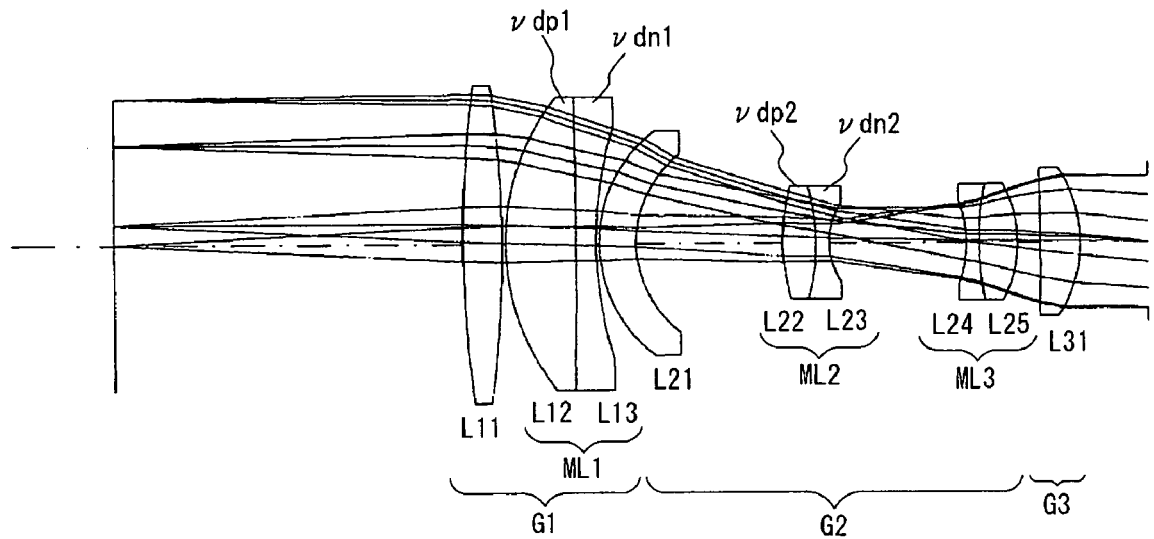
FIG. 34 is a configuration view (optical path view) of an objective lens of an eleventh embodiment.

FIG. 34 is a configuration view (optical path view) of an objective lens of an eleventh embodiment according to the present invention. The eleventh embodiment has a similar configuration as that of the above-described tenth embodiment, and is an infinity objective lens designed such that total magnification β=−0.5 and NA=0.015 when focal length of a subsequent zoom lens system is 100 mm, and a zoom ratio can be increased to a maximum of about 8× and NA can be increased to a maximum of 0.05.

The following Table 8 shows various original values of the eleventh embodiment, as in the above-described eighth embodiment.

TABLE 8

β = −0.5~−3.75, NA = 0.015~0.05, DO = 52.0, F = 198.0

| NO. | R | D | nd | νd |
|---|---|---|---|---|
| 1: | 171.62745 | 5.882876 | 1.77250 | 49.6 |
| 2: | −171.62745 | 0.500000 | | |
| 3: | 35.35032 | 10.656757 | 1.60300 | 65.5 |
| 4: | −968.99678 | 3.000000 | 1.80809 | 22.8 |
| 5: | 57.21174 | 0.500000 | | |
| 6: | 21.16891 | 5.566517 | 1.72916 | 54.7 |
| 7: | 17.03188 | 21.998566 | | |
| 8: | 31.69094 | 5.000000 | 1.80809 | 22.8 |
| 9: | −31.69094 | 2.000000 | 1.81600 | 46.6 |
| 10: | 12.10648 | 20.297055 | | |
| 11: | −16.97407 | 2.000000 | 1.88300 | 40.8 |
| 12: | 43.25710 | 5.713904 | 1.49782 | 82.5 |
| 13: | −18.51337 | 3.378728 | | |
| 14: | −412.62298 | 5.955597 | 1.59240 | 68.3 |
| 15: | −20.57021 | | | |

Figure 35:
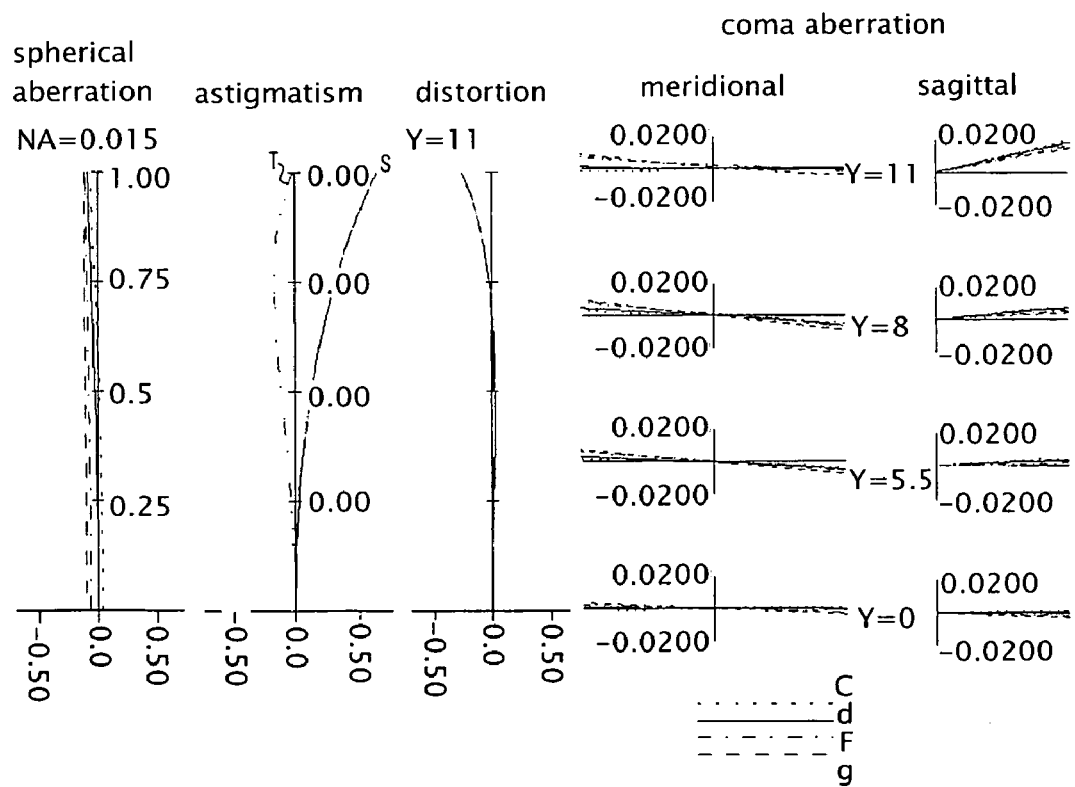
FIG. 35 is a view showing various aberrations in the objective lens of the eleventh embodiment when focal length of a subsequent zoom optical system is 100 mm.
Figure 36:
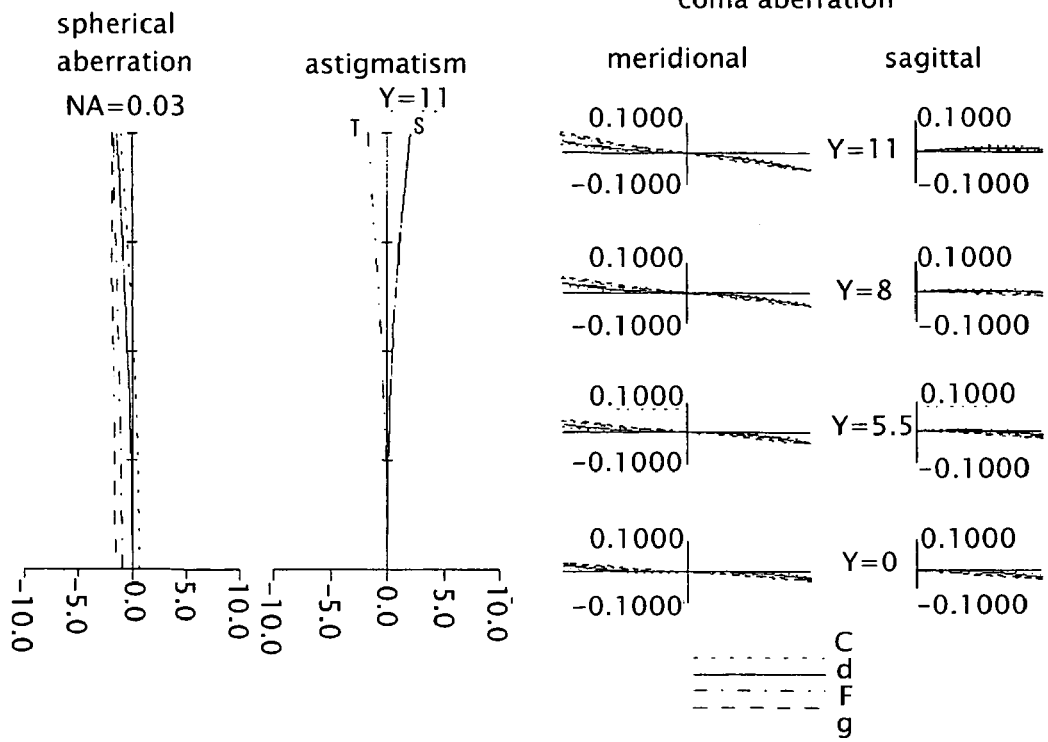
FIG. 36 is a view showing various aberrations in the objective lens of the eleventh embodiment when the focal length of the subsequent zoom optical system is 400 mm.
Figure 37:
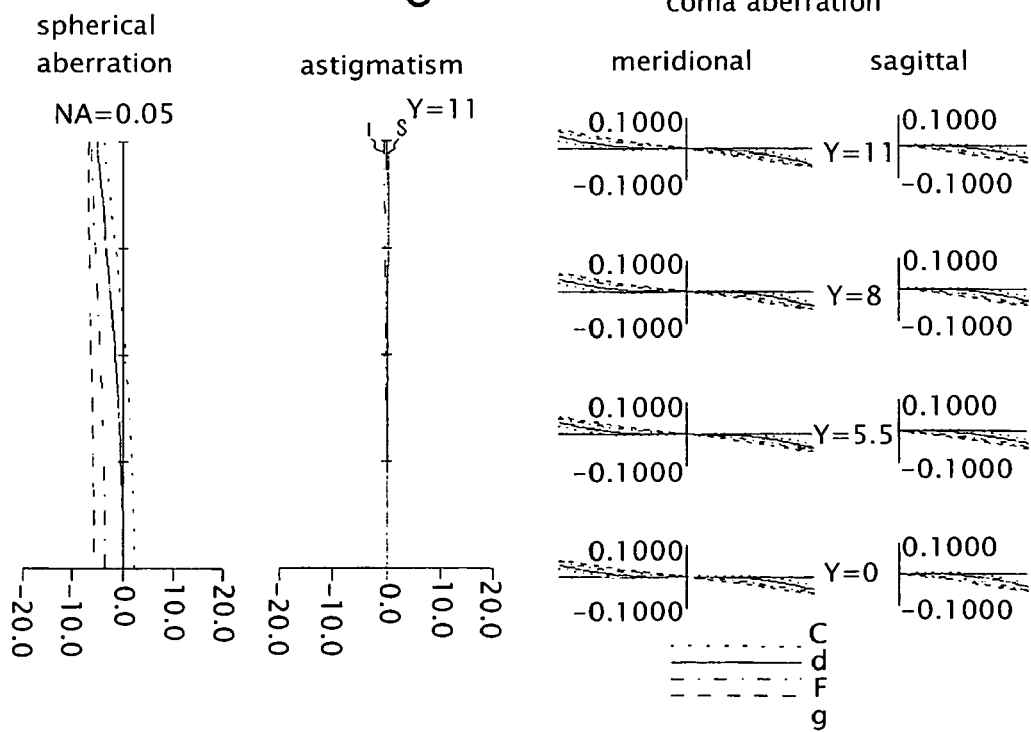
FIG. 37 is a view showing various aberrations in the objective lens of the eleventh embodiment when the focal length of the subsequent zoom optical system is 750 mm.

FIG. 35 to FIG. 37 show various aberrations in the eleventh embodiment.

FIG. 35 is a view showing various aberrations, as in the eighth embodiment, which are calculated as an ideal lens when focal length of a zoom optical system (including an imaging lens) subsequent to the objective lens is 100 mm. As shown in FIG. 35, in the objective lens of the eleventh embodiment, good correction is made in respective wavelengths of the d-line, C-line, F-line, and g-line, with NA=0.015 and field number=22.

FIG. 36 is a view showing various aberrations calculated as an ideal lens when the focal length of the zoom optical system (including the imaging lens) subsequent to the objective lens is 400 mm. As shown in FIG. 36, in the objective lens of the eleventh embodiment, good correction is made in respective wavelengths of the d-line, C-line, F-line, and g-line, with NA=0.03 and field number=22.

FIG. 37 is a view showing various aberrations calculated as an ideal lens when the focal length of the zoom optical system (including the imaging lens) subsequent to the objective lens is 750 mm. As shown in FIG. 37, in the objective lens of the eleventh embodiment, good correction is made in the respective wavelengths of the d-line, C-line, F-line, and g-line, with NA=0.05 and field number=22.

Corresponding values in the respective embodiments will be shown below.

TABLE 9

| | Embodiment | | | |
|---|---|---|---|---|
| | NO. 8 | NO. 9 | NO. 10 | NO. 11 |
| ν dp1/ν dn1 | 1.97 | — | 2.29 | 2.87 |
| ν dn2/ν dp2 | 1.45 | — | 2.04 | 2.04 |
| EP/OD | 1.00 | 1.00 | 1.07 | 1.12 |
| maximum object height α | 0.057 | 0.057 | 0.023 | −0.264 |
| f2 | −13.97 | −11.81 | −11.25 | −12.56 |
| \|R1/f2\| | 0.769 | 0.955 | 1.094 | 0.964 |
| \|R2/f2\| | 0.799 | 1.090 | 1.517 | 1.351 |
| \|HR3/Y\| | 0.80 | — | 0.832 | 0.832 |

The embodiments hitherto have described, as examples, the very low-power objective lens whose unsigned value of the total magnification is equal to or smaller than 1×, when the minimum focal length of the subsequent zoom lens system is 100 mm (end of a wide field of view), but it goes without saying that the present invention is applicable to a low-power range objective lens.

The invention is not limited to the above embodiments and various modifications may be made without departing from the spirit and scope of the invention. Any improvement may be made in part or all of the components.

What is claimed is:

1. A zoom microscope comprising:
   a replaceable infinity correction objective lens;
   an optical member for phase contrast observation removably inserted on or near a rear focal plane of the objective lens;
   an afocal zoom system;
   an aperture stop disposed on or near an entrance pupil plane of the afocal zoom system; and
   an imaging optical system disposed on an image side of the afocal zoom system; wherein
   the objective lens is plural in number and the plural objective lenses are different in magnification from each other, and
   the optical member for phase contrast observation is common to the plural objective lenses,
   the afocal zoom system includes, in order, from the specimen side:
   a first lens group having a positive refractive power;
   a second lens group having a negative refractive power;
   a third lens group having a positive refractive power, and
   a fourth lens group having a positive refractive power,
   the afocal zoom system varies by moving the second lens group and the third lens group in an optical axis direction,
   a magnification $\beta 2L$ of the second lens group is in a low-power end state,
   a magnification $\beta 3L$ of the third lens group is in the low-power end state, and
   a focal length fL of the optical system, which is a combination of the afocal zoom system and the imaging optical system in the low-power state, and a maximum image height Ymax in the lower-power end state, satisfies following conditional expressions:

$-0.1 < \beta 2L < -0.3$ $-0.01 < 1/\beta 3L < 0.04$ $0.05 < Ymax/fL < 0.16.$

* * * * *